(12) United States Patent
Ohta et al.

(10) Patent No.: US 7,174,979 B2
(45) Date of Patent: Feb. 13, 2007

(54) HYBRID VEHICLE

(75) Inventors: Takashi Ohta, Okazaki (JP); Yuji Suzuki, Kariya (JP); Kazuchika Tashima, Anjo (JP); Keiichi Kaneshige, Anjo (JP); Hatsuki Morinaga, Chiryuu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/776,532

(22) Filed: Feb. 12, 2004

(65) Prior Publication Data

US 2004/0168841 A1 Sep. 2, 2004

(30) Foreign Application Priority Data

Feb. 12, 2003 (JP) ............................... 2003-034325

(51) Int. Cl.
 *B60K 6/00* (2006.01)
(52) U.S. Cl. ...................... 180/65.2; 180/65.3; 903/926
(58) Field of Classification Search ................ 903/912, 903/913, 924
See application file for complete search history.

(56) References Cited

U.S. PATENT DOCUMENTS

| | | | | |
|---|---|---|---|---|
| 5,513,719 A | * | 5/1996 | Moroto et al. ............. | 180/65.4 |
| 5,558,588 A | * | 9/1996 | Schmidt ........................ | 475/5 |
| 5,577,973 A | * | 11/1996 | Schmidt ........................ | 475/5 |
| 5,823,281 A | * | 10/1998 | Yamaguchi et al. ........ | 180/65.2 |
| 5,991,683 A | * | 11/1999 | Takaoka et al. ............ | 701/102 |
| 6,048,288 A | * | 4/2000 | Tsujii et al. .................... | 477/5 |
| 6,093,974 A | * | 7/2000 | Tabata et al. ............. | 290/40 R |
| 6,131,680 A | * | 10/2000 | Nii et al. .................... | 180/65.2 |
| 6,135,914 A | * | 10/2000 | Yamaguchi et al. ........... | 477/3 |
| 6,251,037 B1 | * | 6/2001 | Baumgaertner et al. ....... | 475/2 |
| 6,269,895 B1 | * | 8/2001 | Tanuguchi et al. ......... | 180/65.2 |
| 6,302,227 B1 | * | 10/2001 | Takemura et al. ......... | 180/65.2 |
| 6,468,175 B1 | * | 10/2002 | Lehongre ....................... | 475/5 |
| 6,524,217 B1 | * | 2/2003 | Murakami et al. ............. | 477/5 |
| 6,554,736 B2 | * | 4/2003 | Takano et al. ................. | 477/5 |
| 6,615,940 B2 | * | 9/2003 | Morisawa ................... | 180/65.1 |
| 6,691,809 B2 | * | 2/2004 | Hata et al. ................. | 180/65.3 |
| 6,722,332 B2 | * | 4/2004 | Kojima ..................... | 123/179.3 |
| 6,722,457 B2 | * | 4/2004 | Yamaguchi et al. ........ | 180/65.2 |
| 6,823,250 B2 | * | 11/2004 | Yamaguchi et al. ........... | 701/51 |
| 6,883,626 B2 | * | 4/2005 | Aoki et al. ................. | 180/65.2 |
| 6,886,648 B1 | * | 5/2005 | Hata et al. ................. | 180/65.2 |
| 6,966,866 B2 | * | 11/2005 | Ando et al. ..................... | 477/4 |
| 2002/0112901 A1 | * | 8/2002 | Yamaguchi et al. | |

FOREIGN PATENT DOCUMENTS

| | | |
|---|---|---|
| JP | 2002-118903 A | 4/2002 |
| JP | 2002-171601 A | 6/2002 |

\* cited by examiner

*Primary Examiner*—Christopher P. Ellis
*Assistant Examiner*—Christopher Bottorff
(74) *Attorney, Agent, or Firm*—Birch, Stewart, Kolasch, and Birch, LLP

(57) ABSTRACT

There is provided a hybrid car which includes an internal combustion engine; an electric motor disposed coaxially with a rotary shaft of the internal combustion engine; a planetary gear mechanism which is disposed coaxially with the rotary shaft of the internal combustion engine and the rotary shaft of the electric motor, and is comprised of a sun gear, a ring gear, planetary pinions, and a carrier supporting the planetary pinions; a transmission comprising an input shaft to which power is transmitted from said internal combustion engine and said electric motor via said planetary gear mechanism and an output shaft connected to driving wheels; and a rotation restricting device that properly restricts rotation of a rotor of the electric motor.

9 Claims, 8 Drawing Sheets

(a) ENGINE START (b) POWER GENERATION WHEN VEHICLE IS AT STANDSTILL (c) DRIVE BY MOTOR (d) DRIVE BY ENGINE (e) DRIVE BY ENGINE AND MOTOR (f) POWER GENERATION WHEN VEHICLE IS RUNNING (g) ENGINE TORQUE INCREASE IN STARTING (h) SLOW DECELERATION REGENERATIVE BRAKING (i) RAPID DECELERATION REGENERATIVE BRAKING (j) DRIVE (REARWARD) BY ENGINE (a) ENGINE START (b) POWER GENERATION WHEN VEHICLE IS AT STANDSTILL (c) DRIVE BY MOTOR (d) DRIVE BY ENGINE (e) DRIVE BY ENGINE AND MOTOR (f) POWER GENERATION WHEN VEHICLE IS MOVING (g) ENGINE TORQUE INCREASE IN STARTING (h) SLOW DECELERATION REGENERATIVE BRAKING (i) RAPID DECELERATION REGENERATIVE BRAKING (j) DRIVE (REARWARD) BY ENGINE (a) ENGINE START (b) POWER GENERATION WHEN VEHICLE IS AT STANDSTILL (c) DRIVE BY MOTOR (d) DRIVE BY ENGINE (e) DRIVE BY ENGINE AND MOTOR (f) POWER GENERATION WHEN VEHICLE IS MOVING (g) ENGINE TORQUE INCREASE IN STARTING (h) SLOW DECELERATION REGENERATIVE BRAKING (i) RAPID DECELERATION REGENERATIVE BRAKING (j) DRIVE (REARWARD) BY ENGINE

HYBRID VEHICLE

CROSS-REFERENCE TO RELATED APPLICATION

This application incorporates by reference the subject matter of Application No. 2003-034325 filed in Japan on Feb. 12, 2003, on which a priority claim is based under 35 U.S.C § 119(a).

BACKGROUND OF THE INVENTION

1. Field of the Invention

The present invention relates to a hybrid vehicle that is equipped with an internal combustion engine and an electric motor for driving the vehicle.

2. Description of the Related Art

In recent years, a hybrid vehicle which is equipped with both an internal combustion engine (hereinafter referred to as "engine") and an electric motor (hereinafter referred to as "electric motor" or simply as "motor") for driving the vehicle has been developed.

In particular, there have been developed a hybrid vehicle which is constructed such that a planetary gear mechanism capable of absorbing rotations of an engine and an electronic motor is interposed between the engine and the electric motor and a transmission with a torque converter being omitted so that the total length of the transmission can be reduced (refer to Japanese Laid-Open Patent Publication (Kokai) No. 2002-118903), and a hybrid vehicle which is combined with a continuously variable transmission (CVT) to efficiently run an engine and a motor, thus improving both the fuel economy and the driving performance (refer to Japanese Laid-Open Patent Publication (Kokai) No. 2002-171601).

FIG. 7 is a view schematically showing a driving system (mainly a transmission) of the hybrid vehicle disclosed in Japanese Laid-Open Patent Publication (Kokai) No. 2002-118903. As shown in FIG. 7, a planetary gear mechanism 2 is provided at the inlet of a transmission 1. The planetary gear mechanism 2 is a double pinion type, which is comprised of a sun gear 21, an inner pinion 22 which is engaged with the sun gear 21, an outer pinion 23 which is engaged with the inner pinion, a carrier 24 which supports the pinions 22 and 23, and a ring gear 25 which is engaged with the outer pinion 23.

The sun gear 21 is connected to a rotary shaft 3a of an engine 3, and a rotor 41 of an electric motor 4 is connected to the carrier 24. On the other hand, the carrier 24 can be connected to an input shaft 61 of a CVT 6 via a carrier clutch 51, while the ring gear 25 can be connected to the input shaft 61 of the CVT 6 via a ring gear clutch 52. A ring gear brake 53 is interposed between a transmission casing 11 and the ring gear 25. Further, the transmission casing 11 is provided with a stator 42 of the electric motor 4 such that the stator 42 is opposed to the rotor 41.

The CVT 6 includes a primary pulley 62 connected to the input shaft 61 and a secondary pulley 64 connected to the primary pulley 62 via a belt 63. An output shaft 65 of the CVT 6 is connected to the secondary pulley 64. It should be noted that the primary pulley 62 includes a movable sheave 62a and a fixed sheave 62b, and the secondary pulley 64 includes a movable sheave 64a and a fixed sheave 64b.

Further, rotation of the output shaft 65 is transmitted to a differential gear 8 via a gear 66 fixedly installed on the output shaft 65, a counter gear 71 fixedly installed on a counter shaft 7, and a ring gear 81. This rotatively drives left and right wheel axles (wheel driving shafts) 9L and 9R via the differential gear 8.

The carrier clutch 51, ring gear clutch 52, and ring gear brake 53 are hydraulic friction engaging devices of a wet multi-disc type which is friction-engaged by a hydraulic actuator, and is friction-engaged by hydraulic fluid supplied from a hydraulic control circuit, not shown. As shown in Table 1, various power transmission states as shown in a nomographic chart of FIG. 8 are achieved by properly engaging and disengaging the clutches 51 and 52 and the brake 53.

TABLE 1

| | OPERATIVE MODE OF DRIVING SYSTEM | CARRIER CLUTCH | RING GEAR CLUTCH | RING GEAR BRAKE |
|---|---|---|---|---|
| (a) | ENGINE IS STARTED BY ELECTRIC MOTOR | X | X | ○ |
| (b) | POWER GENERATING WHEN VEHICLE IS AT STANDSTILL (P RANGE) | X | X | ○ |
| (c) | DRIVE BY ELECTRIC MOTOR (FORWARD, REARWARD) | ○ | X | X |
| (d) | DRIVE BY ENGINE | ○ | ○ | X |
| (e) | DRIVE BY ENGINE AND MOTOR | ○ | ○ | X |
| (f) | POWER GENERATING IN DRIVING | ○ | ○ | X |
| (g) | ENGINE TORQUE INCREASE (IN STARTING, AND LOW SPEED→INTERMEDIATE OR HIGH SPEED) | X→○ | ○ | X |
| (h) | REGENERATIVE BRAKING (AT LOW SPEED) | ○ | X | X |
| (i) | REGENERATIVE BRAKING (AT INTERMEDIATE OR HIGH SPEED) | ○ | ○ | X |
| (j) | DRIVE REARWARD BY ENGINE | ○ | X | □ |

X: UNENGAGED,
○: ENGAGED,
□: FRICTION - ENGAGED

Specifically, in the case where the engine 3 is started by the electric motor 4, only the ring gear brake 53 is engaged while the carrier clutch 51 and the ring gear clutch 52 are unengaged (refer to Table 1(a)). Then, as shown in FIG. 8(a), running the electric motor 4 at a sufficient speed enables the engine 3 to be started. On this occasion, the rotational direction of the motor 4 is opposite to that of the engine 3. Of course, since the carrier clutch 51 and the ring gear clutch 52 are unengaged on this occasion, power is not transmitted to driving wheels.

Also, in the case where the electric motor 4 is run as a power generator for the purpose of charging while the vehicle is at a standstill, only the ring gear brake 53 is engaged while the carrier clutch 51 and the ring gear clutch 52 are unengaged (refer to Table 1(b)). Then, as shown in FIG. 8(b), if the engine 3 rotates the electric motor 4, the electric motor 4 functions as a power generator to generate power for charging. On this occasion as well, the rotational direction of the motor 4 is opposite to that of the engine 3. Further, of course, power is not transmitted to driving wheels.

In the case where the vehicle is driven by only the electric motor 4, only the carrier clutch 51 is engaged while the ring gear clutch 52 and the ring gear brake 53 are unengaged (refer to Table 1(c)). Then, assuming that there is no input from the engine 3 (i.e. the sun gear 21 is stopped), as indicated by a thick solid line in FIG. 8(c), if the electric motor 4 is rotated in the direction opposite to the rotational direction of the engine 3, forward driving torque is input to the CVT 6 to move the vehicle forward, and as indicated by a broken line in FIG. 8(c), if the electric motor 4 is rotated in the same direction as the rotational direction of the engine 3, rearward driving torque is input to the CVT 6 to back the vehicle.

On the other hand, in the case where the vehicle is driven by only the engine 3, the carrier clutch 51 and the ring gear clutch 52 are engaged while the ring gear brake 53 is unengaged (refer to Table 1(d)). Therefore, as shown in FIG. 8(d), the sun gear 21, the planetary carrier 24, the ring gear 25, and the input shaft 61 of the CVT 6 are directly connected to each other, i.e. rotated integrally with each other, and when only the engine 3 is run, forward driving torque is input from the engine 3 to the CVT 6 to move the vehicle forward.

Further, in the case where the vehicle is driven using both the engine 3 and the electric motor 4, the carrier clutch 51 and the ring gear clutch 52 are engaged while the ring gear brake 53 is unengaged as above (refer to Table 1(e)). Therefore, as shown in FIG. 8(e), the sun gear 21, the planetary carrier 24, the ring gear 25, and the input shaft 61 of the CVT 6 are directly connected to each other, i.e. rotated integrally with each other, and when the engine 3 and the electric motor 4 are run, forward driving torque is input from the engine 3 and the electric motor 4 to the CVT 6 to move the vehicle forward.

Further, in the case where power is generated using the electric motor 4 while the vehicle is running, the carrier clutch 51 and the ring gear clutch 52 are engaged while the ring gear brake 53 is unengaged as above (refer to Table 1(f)). Therefore, as shown in FIG. 8(f), the sun gear 21, the planetary carrier 24, the ring gear 25, and the input shaft 61 of the CVT 6 are directly connected to each other, i.e. rotated integrally with each other, and when the electric motor 4 is run as a power generator while the engine 3 is run, part of driving force of the engine 3 rotatively drives the electric motor 4 as a power generator, and the rest of the driving force of the engine 3 is input as forward driving torque to the CVT 6 to move the vehicle forward.

Further, in the case where starting using the electric motor 4 is desired to be avoided due to a low battery capacity, and in the case where torque from the engine 3 is desired to be increased e.g. in extremely low vehicle speed/high load starting (rapid climbing road starting), the ring gear brake 53 is disengaged, the ring gear clutch 52 is engaged, and the carrier clutch 51 is kept unengaged after the engine 3 is started (refer to Table 1(g)). As indicated by a broken line in FIG. 8(g), when power is generated using the electric motor 4, the force applied to the electric motor 4 serves as reactive force for engine torque to increase engine torque, so that the electric motor 4 and the engine 3 are controlled such that the ring gear 25 is rotated forward, and as a result, the vehicle can be started.

If the carrier clutch 51 is gradually engaged in this state, the vehicle running state can be changed to a normal running state, i.e. a running state in which the vehicle is run using the engine 3 (refer to FIG. 8(d)), a running state in which the vehicle is driven using both the engine 3 and the electric motor 4 (refer to FIG. 8(e)), or a running state in which the vehicle is run using the engine 3 while power is generated by the electric motor 4 (refer to FIG. 8(f)) as indicated by a solid line in FIG. 8(g).

If regenerative braking conditions (for example, an accelerator is off, or a brake is on) are satisfied when the vehicle is running at a low speed (using only the electric motor 4), the carrier clutch 51 is engaged while the ring gear clutch 52 and the ring gear brake 53 are unengaged (refer to Table 1(h)). Then, the electric motor 4 is run to generate power and the CVT 6 is controlled to a low gear side, so that as shown in FIG. 8(h), rotation of the input shaft 61 of the CVT 6 is transmitted to the rotor 41 of the electric motor 4 via the planetary gear mechanism 2, and regenerative braking is carried out such that driving energy is converted into power generating energy (energy which drives the electric motor 4 to generate power).

Further, if regenerative braking conditions (for example, an accelerator is off, or a brake is on) are satisfied when the vehicle is running at an intermediate or high speed (using only the engine 4, or using the engine 3 and the electric motor 4), the carrier clutch 51 and the ring gear clutch 52 are engaged while the ring gear brake 53 is unengaged (refer to Table 1(i)). Then, the electric motor 4 is run to generate power and the CVT 6 is controlled to a low gear side so that engine output can be decreased, so that as shown in FIG. 8(i), revolution of the engine 3 and rotation of the input shaft 61 of the CVT 6 are transmitted to the rotor 41 of the electric motor 4 via the planetary gear mechanism 2, and regenerative braking is carried out such that engine revolving energy and driving energy are converted into power generating energy (energy which drives the electric motor 4 to generate power).

Further, in the case where the vehicle is backed using an output from the engine 3, the carrier clutch 51 is engaged while the ring gear clutch 52 is unengaged, and further the unengaged ring gear brake 53 is brought into a friction engaged state (refer to Table 1(j)). If the ring gear brake 52 is friction-engaged and the CVT 6 is controlled to rotate the planetary carrier 24 in the opposite direction, the running state is changed from a state indicated by a chain line in FIG. 8(j) to a state indicated by a solid line in FIG. 8(j), and the planetary carrier 24 is rotatively driven in the opposite direction by engine revolution to back the vehicle.

According to the above-described prior art, however, the rotor 41 of the motor 4 is basically configured to constantly rotate even when the electric motor 4 is not operated. This causes energy loss, and heat is likely to be generated in the motor 4 and may affect peripheral parts. Further, due to e.g. the action of counter electromotive force when the motor 4 is controlled, the higher the motor rotational speed is, the higher is the battery voltage required for controlling the rotation of the motor 4.

In recent years, a high-voltage battery has been developed for a hybrid vehicle, but to obtain a sufficiently high battery voltage, a plurality of batteries has to be connected in series. This increases vehicle costs, and necessitates taking measures to cope with high voltages.

Of course, if the vehicle is configured to be driven mainly by the electric motor 4, a high battery capacity is accordingly required to unavoidably increase vehicle weight and costs, but if the vehicle is configured to be driven using mainly the engine 3 and using the electric motor 4 supplementary, a lower battery capacity suffices. In this case, it is preferred that the electric motor 4 is stopped when unnecessary, and is operated at as low speed as possible.

SUMMARY OF THE INVENTION

In view of the foregoing, the present invention provides a hybrid vehicle which is capable of stopping an electric motor if unnecessary, and is capable of running the electric motor at as low speed as possible.

More specifically, according to one aspect of the invention, there is provided a hybrid vehicle which includes an internal combustion engine; an electric motor disposed coaxially with a rotary shaft of the internal combustion engine; a planetary gear mechanism disposed coaxially with the rotary shaft of the internal combustion engine and the rotary shaft of the electric motor, the planetary gear mechanism comprised of a sun gear, a ring gear, planetary pinions, and a carrier supporting the planetary pinions; a transmission comprising an input shaft to which power is transmitted from the internal combustion engine and the electric motor via the planetary gear mechanism and an output shaft connected to driving wheels; and a rotation restricting device that properly restricts rotation of a rotor of the electric motor.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein:

FIGS. 2(a) TO 2(j) are nomographic charts showing elements of a planetary gear mechanism in the driving system of the hybrid vehicle according to the first embodiment, in which FIG. 2(a) shows the case where an engine is started, FIG. 2(b) shows the case where power is generated when the vehicle is at a standstill, FIG. 2(c) shows the case where the vehicle is driven by a motor, FIG. 2(d) shows the case where the vehicle is driven by an engine, FIG. 2(e) shows the case where the vehicle is driven by the engine and the motor, FIG. 2(f) shows the case where power is generated while the vehicle is running, FIG. 2(g) shows the case where engine torque is required to be increased, FIG. 2(h) shows the case where slow deceleration regenerative braking is carried out, FIG. 2(i) shows the case where rapid deceleration regenerative braking is carried out, and FIG. 2(j) shows the case where the vehicle is backed the engine;

FIGS. 4(a) TO 4(j) are nomographic charts showing elements of a planetary gear mechanism in the driving system of the hybrid vehicle according to the second embodiment, in which FIG. 4(a) shows the case where an engine is started, FIG. 4(b) shows the case where power is generated when the vehicle is at a standstill, FIG. 4(c) shows the case where the vehicle is driven by a motor, FIG. 4(d) shows the case where the vehicle is driven by an engine, FIG. 4(e) shows the case where the vehicle is driven by the engine and the motor, FIG. 4(f) shows the case where power is generated while the vehicle is running, FIG. 4(g) shows the case where engine torque is required to be increased, FIG. 4(h) shows the case where slow deceleration regenerative braking is carried out, FIG. 4(i) shows the case where rapid deceleration regenerative braking is carried out, and FIG. 4(j) shows the case where the vehicle is backed by the engine;

FIGS. 6(a) to 6(j) are nomographic charts showing elements of a planetary gear mechanism in the driving system of the hybrid vehicle according to the second embodiment, in which FIG. 6(a) shows the case where an engine is started, FIG. 6(b) shows the case where power is generated when the vehicle is at a standstill, FIG. 6(c) shows the case where the vehicle is driven by a motor, FIG. 6(d) shows the case where the vehicle is driven by an engine, FIG. 6(e) shows the case where the vehicle is driven by the engine and the motor, FIG. 6(f) shows the case where power is generated while the vehicle is running, FIG. 6(g) shows the case where engine torque is required to be increased, FIG. 6(h) shows the case where slow deceleration regenerative braking is carried out, FIG. 6(i) shows the case where rapid deceleration regenerative braking is carried out, and FIG. 6(j) shows the case where the vehicle is backed by the engine;

FIGS. 8(a) to 8(j) are nomographic charts showing elements of a planetary gear mechanism in the driving system of the hybrid vehicle according to the prior art, in which FIG. 8(a) shows the case where an engine is started, FIG. 8(b) shows the case where power is generated when the vehicle is at a standstill, FIG. 8(c) shows the case where the vehicle is driven by a motor, FIG. 8(d) shows the case where the vehicle is driven by an engine, FIG. 8(e) shows the case where the vehicle is driven by the engine and the motor, FIG. 8(f) shows the case where power is generated while the vehicle is running, FIG. 8(g) shows the case where engine torque is required to be increased, FIG. 8(h) shows the case where slow deceleration regenerative braking is carried out, FIG. 8(i) shows the case where rapid deceleration regenerative braking is carried out, and FIG. 8(j) shows the case where the vehicle is backed by the engine.

DETAILED DESCRIPTION OF THE PRESENT INVENTION

The present invention will now be described in detail with reference to the accompanying drawings showing embodiments thereof.

Figure 1:
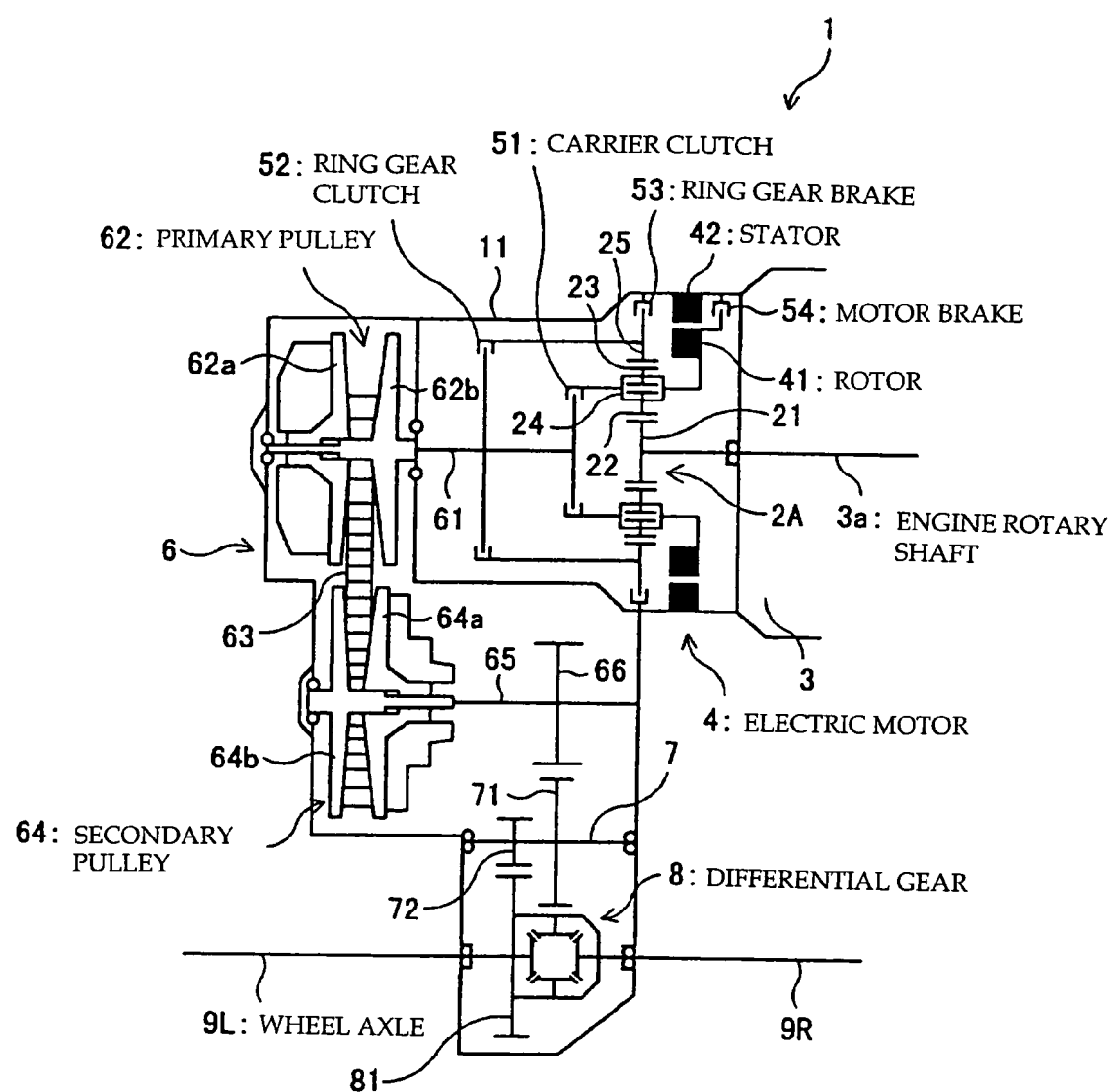
FIG. 1 is a view schematically showing a driving system (mainly a transmission) of a hybrid vehicle according to a first embodiment of the present invention.
Figure 2:
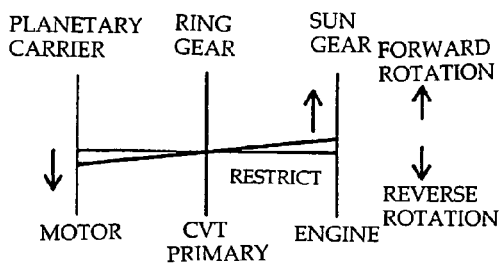
Figure 2:
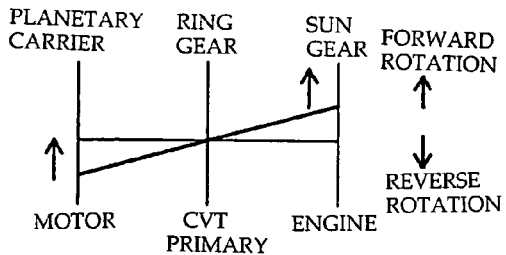
Figure 2:
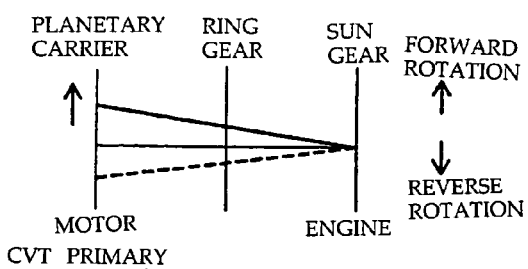
Figure 2:
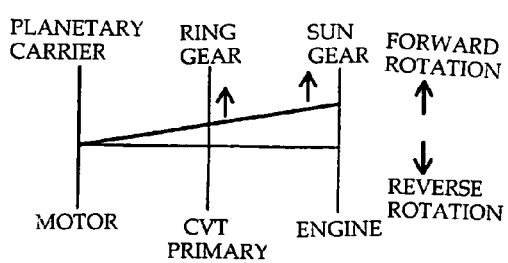
Figure 2:
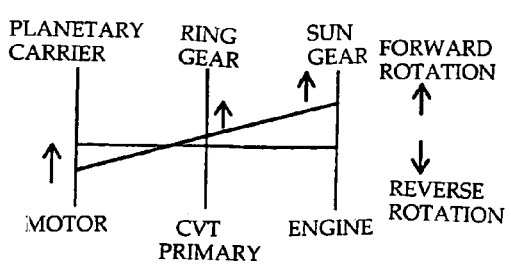
Figure 2:
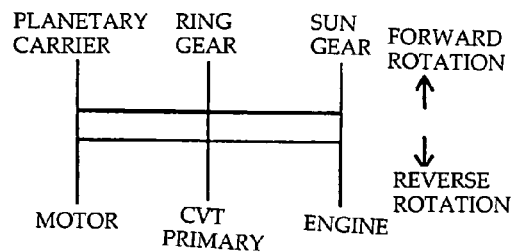
Figure 2:
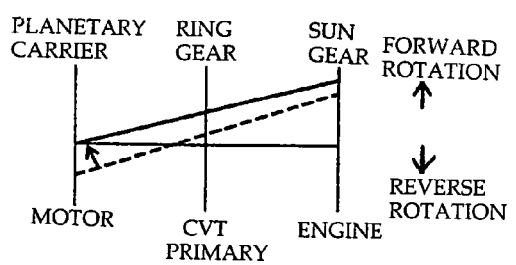
Figure 2:
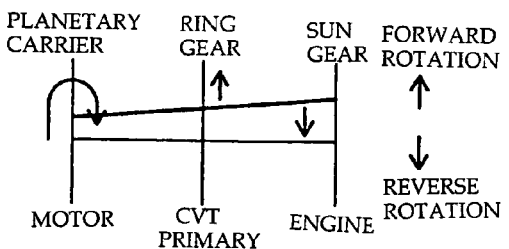
Figure 2:
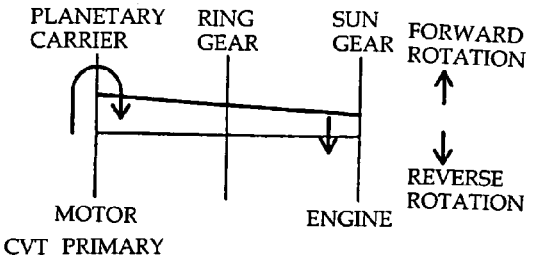
Figure 2:
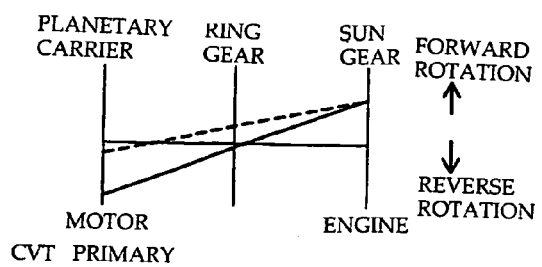

First, a first embodiment of the present invention will be described. FIGS. 1 and 2 are views showing a hybrid vehicle according to the first embodiment, in which FIG. 1 is a driving system (mainly a transmission) of the hybrid vehicle, and FIG. 2 is a nomographic chart showing elements of a planetary gear mechanism in the driving system. It should be noted that in FIG. 1, the same reference numerals as in FIG. 7 denote elements and parts similar to or corresponding to those illustrated in FIG. 7.

Figure 7:
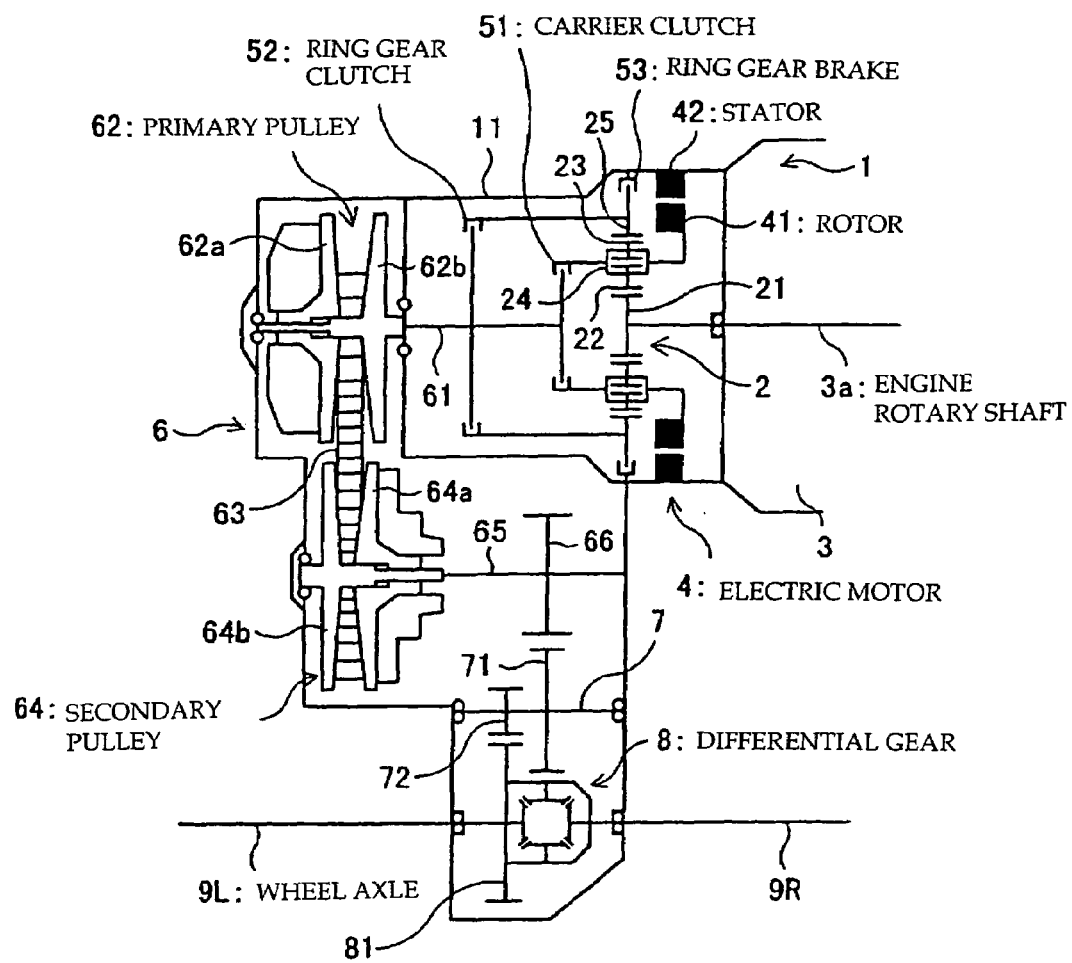
FIG. 7 is a view schematically showing a driving system (mainly a transmission) of a hybrid vehicle according to a prior art.

The driving system of the hybrid vehicle according to the present embodiment is constructed such that as shown in FIG. 1, a motor brake (a second rotation restricting device) 54 is added to the component parts of the hybrid vehicle according to the above described prior art (refer to FIG. 7).

Specifically, a planetary gear mechanism 2A is provided at the entrance of a transmission 1. The planetary gear mechanism 2A is a double pinion type, which is comprised of a sun gear 21, an inner pinion 22 which is engaged with the sun gear 21, an outer pinion 23 which is engaged with the inner pinion, a planetary carrier 24 (also referred to as "carrier") which supports the pinions 22 and 23, and a ring gear 25 which is engaged with the outer pinion 23.

The sun gear 21 is connected to a rotary shaft 3a of an engine (internal combustion engine) 3, and a rotor 41 of an electric motor (hereinafter referred to as "electric motor" or simply as "motor") 4 is connected to the carrier 24. On the other hand, the carrier 24 can be connected to an input shaft 61 of a CVT 6 via a carrier clutch (a first engaging/ disengaging device) 51, while the ring gear 25 can be connected to the input shaft 61 of the CVT 6 via a ring gear clutch (a second engaging/disengaging device) 52. A ring gear brake (a first rotation restricting device) 53 is interposed between a transmission casing 11 and the ring gear 25. Further, the transmission casing 11 is provided with a stator 42 of the electric motor 4 such that the stator 42 is opposed to the rotor 41.

The motor brake 54 is interposed between the rotor 41 of the electric motor 4 and the transmission casing 11.

The CVT 6 includes a primary pulley 62 connected to the input shaft 61 and a secondary pulley 64 connected to the primary pulley 62 via a belt 63. An output shaft 65 of the CVT 6 is connected to the secondary pulley 64. It should be noted that the primary pulley 62 includes a movable sheave 62a and a fixed sheave 62b, and the secondary pulley 64 includes a movable sheave 64a and a fixed sheave 64b.

Further, rotation of the output shaft 65 is transmitted to a differential gear 8 via a gear 66 fixedly installed on the output shaft 65, a counter gear 71 fixedly installed on a counter shaft 7, and a ring gear 81. This rotatively drives left and right wheels (wheel driving shafts) 9L and 9R via the differential gear 8.

The carrier clutch 51, ring gear clutch 52, and ring gear brake 53 are hydraulic friction engaging devices of a wet multi-disc type which is friction-engaged by a hydraulic actuator, and is friction-engaged by hydraulic fluid supplied from a hydraulic control circuit, not shown. As shown in Table 1, the clutches 51 and 52 and the brake 53 are engaged and disengaged properly to realize various power transmission states as shown in a nomographic chart of FIG. 2.

TABLE 2

| | OPERATIVE MODE OF DRIVING SYSTEM | CARRIER CLUTCH | RING GEAR CLUTCH | RING GEAR BRAKE | MOTOR BRAKE |
|---|---|---|---|---|---|
| (a) | ENGINE IS STARTED BY ELECTRIC MOTOR | X | X | ○ | X |
| (b) | POWER GENERATING WHEN VEHICLE IS AT STANDSTILL (P RANGE) | X | X | ○ | X |
| (c) | DRIVE BY ELECTRIC MOTOR (FORWARD AT LOW SPEED, REARWARD) | ○ | X | X | X |
| (d) | DRIVE BY ENGINE (AT INTERMEDIATE OR HIGH SPEED) | X | ○ | X | ○ |
| (e) | DRIVE BY ENGINE AND MOTOR | X | ○ | X | X |
| (f) | POWER GENERATING IN DRIVING | ○ | ○ | X | X |
| (g) | ENGINE TORQUE INCREASE (IN STARTING, AND LOW SPEED→INTERMEDIATE OR HIGH SPEED) | X | ○ | X | X→○ |
| (h) | REGENERATIVE BRAKING (IN SLOW DECELERATION) | X | ○ | X | X |
| (i) | REGENERATIVE BRAKING (IN RAPID DECELERATION) | X→○ | ○→X | X | X |
| (j) | DRIVE REARWARD BY ENGINE | ○ | X | X→□ | X |

X: UNENGAGED,
○: ENGAGED,
□: FRICTION - ENGAGED

Figure 8:
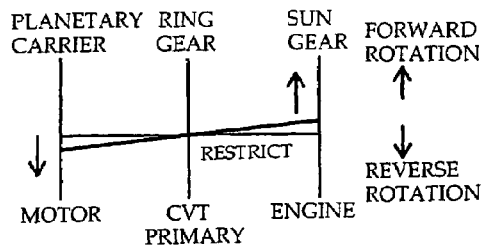
Figure 8:
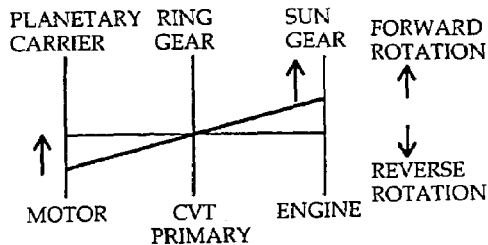
Figure 8:
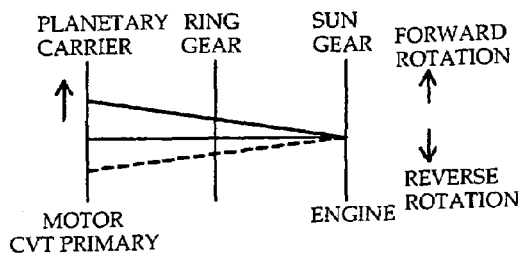
Figure 8:
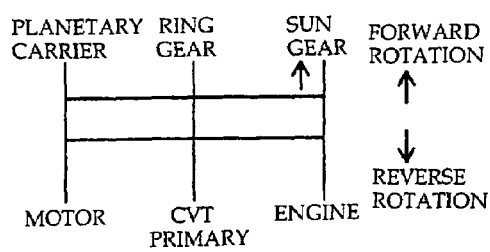
Figure 8:
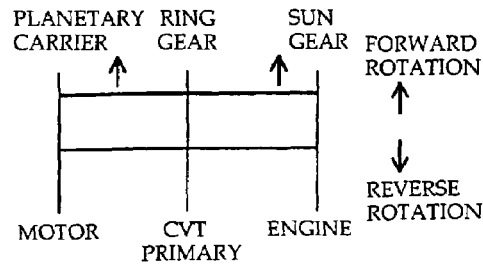
Figure 8:
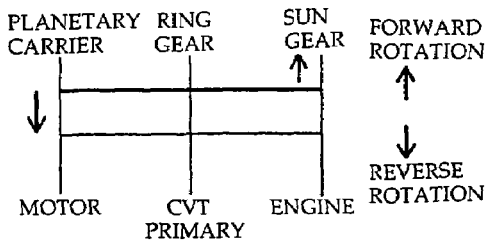
Figure 8:
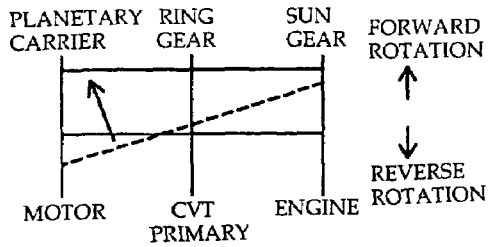
Figure 8:
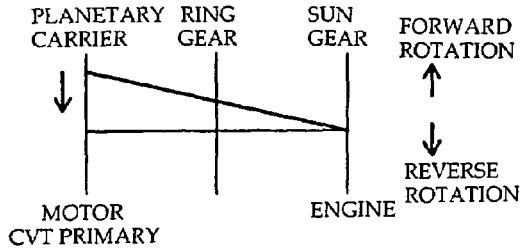
Figure 8:
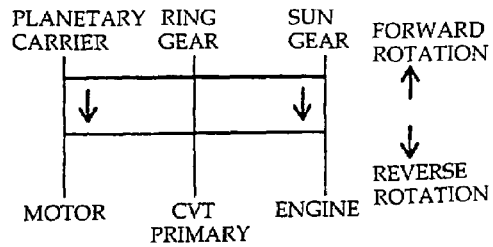
Figure 8:
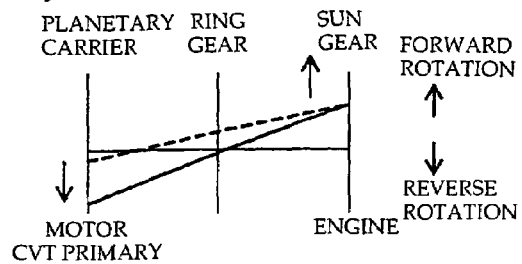

The present embodiment assumes the case where the clutches 51 and 52 and the brakes 53 and 54 are controlled in the same manner as in the prior art (refer to Table 1 and FIG. 8), and the case where the clutches 51 and 52 and the brakes 53 and 54 are controlled differently from the prior art (refer to Table 1 and FIG. 8).

Specifically, in the case where the engine 3 is started by the electric motor 4, only the ring gear brake 53 is engaged while the carrier clutch 51 and the ring gear clutch 52 are unengaged as in the prior art, and of course, the motor brake 54 is unengaged as well (refer to Table 2(a)). Then, as shown in FIG. 2(a), running the electric motor 4 at a sufficient speed enables the engine 3 to be started. On this occasion, the rotational direction of the motor 4 is opposite to that of the engine 3. Of course, since the carrier clutch 51 and the ring gear clutch 52 are unengaged on this occasion, power is not transmitted to driving wheels.

Also, in the case where the electric motor 4 is run as a power generator for the purpose of charging while the vehicle is at a standstill, only the ring gear brake 53 is engaged while the carrier clutch 51 and the ring gear clutch 52 are unengaged as in the prior art (refer to Table 2(b)), and of course, the motor brake 54 is unengaged as well. Then, as shown in FIG. 2(b), if the engine 3 rotates the electric motor 4, the electric motor 4 functions as a power generator to generate power for charging. On this occasion, the rotational direction of the motor 4 is opposite to that of the engine 3 as above. Further, of course, power is not transmitted to driving wheels.

Further, in the case where the vehicle is driven by only the electric motor 4, only the carrier clutch 51 is engaged while the ring gear clutch 52 and the ring gear brake 53 are disengaged as in the prior art (refer to Table 2(c)), and of course, the motor brake 54 is unengaged as well. Then, assuming that there is no input from the engine 3 (i.e. the sun gear 21 is stopped), as indicated by a thick solid line in FIG. 2(c), if the electric motor 4 is rotated in the direction opposite to the rotational direction of the engine 3, forward driving torque is input to the CVT 6 to move the vehicle forward, and as indicated by a broken line in FIG. 2(c), if the electric motor 4 is rotated in the same direction as the rotational direction of the engine 3, rearward driving torque is input to the CVT 6 to back the vehicle. This mode in which the vehicle is driven by only the electric motor 4 is executed when the vehicle is running at a low speed.

On the other hand, in the case where the vehicle is driven by only the engine 3, the carrier clutch 51 and the ring gear clutch 52 are engaged while the ring gear brake 53 is disengaged (refer to Table 2(d)). Therefore, as shown in FIG. 2(d), the sun gear 21, the planetary carrier 24, the ring gear 25, and the input shaft 61 of the CVT 6 are directly connected to each other, i.e. rotated integrally with each other, and when only the engine 3 is run, forward driving torque is input from the engine 3 to the CVT 6 to move the vehicle forward. On this occasion, the rotor 41 of the motor 4 is stopped by the motor brake 54.

On this occasion, the ratio of the rotational speed of the sun gear 21 and the ring gear 25 (i.e. the ratio of the rotational speed of the output shaft 3a of the engine 3 and the CVT input shaft 61 is 1: (smaller than 1) as shown in FIG. 2(d).

Further, the above described mode in which the vehicle is driven by only the engine 3 is executed when the vehicle is running at an intermediate or high speed or when the vehicle is running at a low speed in the case where the residual capacity of a battery, not shown, as a power supply for the electric motor 4 is equal to or smaller than a reference value.

Further, in the case where the vehicle is driven using both the engine 3 and the electric motor 4, the ring gear clutch 52 is engaged while the carrier clutch 51 and the ring gear brake 52 are unengaged as is distinct from the prior art, and of course, the motor brake 54 is unengaged as well (refer to Table 2(e)). Then, the engine 3 is operated, and the motor 4 is driven in the direction opposite to the rotational direction of the engine 3 and at a relatively low speed as compared with the engine 3, so that as shown in FIG. 2(e), the ring gear 2 is rotatively driven forward, and torque of the engine 3 and the electric motor 4 is input as forward driving torque from the ring gear 25 to the CVT 6 to move the vehicle forward. This mode in which the vehicle is driven by both the engine 3 and the electric motor 4 is executed when the vehicle is started and when the vehicle is driven at a low speed and with a high load applied thereto.

Further, in the case where power is generated using the electric motor 4 while the vehicle is running, the carrier clutch 51 and the ring gear clutch 52 are engaged while the ring gear brake 53 is unengaged as is the case with the prior art, and of course, the motor brake 54 is unengaged as well (refer to Table 2(f)). As a result, as shown in FIG. 2(f), the sun gear the sun gear 21, the planetary carrier 24, the ring gear 25, and the input shaft 61 of the CVT 6 are directly connected to each other, i.e. rotated integrally with each other, and when the electric motor 4 is run as a power generator while the engine 3 is run, part of driving force of the engine 3 rotatively drives the electric motor 4 as a power generator, and the rest of the driving force of the engine 3 is input as forward driving torque to the CVT 6 to move the vehicle forward.

Further, in the case where starting using the electric motor 4 is desired to be avoided due to a low battery capacity, and in the case where torque from the engine 3 is desired to be increased e.g. in extremely low vehicle speed/high load starting (rapid climbing road starting), the ring gear brake 53 is disengaged, the ring gear clutch 52 is engaged, and the motor brake 54 is kept unengaged (refer to Table 2(g)) after the engine 3 is started (the ring gear brake 53 is engaged while the carrier clutch 51, ring gear clutch 52, and the motor brake 54 are unengaged; refer to Table 2(a) and FIG. 2(a)). As indicated by a broken line in FIG. 2(g), if power is generated using the electric motor 4 after the engine speed is increased to such a speed as to enable output of a great engine torque, the vehicle can be started with a greater engine torque than normal.

Then, if the motor brake 54 is gradually engaged at a time point the rotational speed of the rotor 41 of the electric motor 4 becomes approximately 0, the vehicle can be brought into a normal running state, i.e. a running state in which the vehicle is driven by the engine 3 (refer to FIG. 8(f)) as indicated by a solid line in FIG. 2(g) when the motor brake 54 is completely engaged.

Further, if slow deceleration regenerative braking conditions (for example, an accelerator is off) when the vehicle is driven by only the engine 3 with the ring gear clutch 52 and the motor brake 54 being engaged and the carrier clutch 51 and the ring gear brake 53 being unengaged; the motor brake 54 is disengaged, the ring gear clutch 52 is kept engaged, and the carrier clutch 51 and the ring gear brake 53 are kept unengaged (refer to Table 2(h)). Then, the electric motor 4 is caused to generate power, and the CVT 6 is controlled to a low gear side to decrease engine output. As a result, as shown in FIG. 2(h), rotation of the input shaft 61 of the CVT 6 is transmitted to the rotor 41 of the electric motor 4 via the planetary gear mechanism 2 (i.e. the ring gear 25, planetary pinion 23, and carrier 24), and slow regenerating braking corresponding to engine brake is carried out such that running energy is converted into power generating energy (energy which drives the electric motor 4 to generate power).

Further, if rapid deceleration regenerative braking conditions (for example, a brake is off) when the vehicle is driven by only the engine 3 (with the ring gear clutch 52 and the motor brake 54 being engaged and the carrier clutch 51 and the ring gear brake 53 being unengaged), the motor brake 54 is disengaged, the ring gear clutch 52 is kept engaged, and the carrier clutch 51 and the ring gear brake 53 are kept unengaged (refer to Table 2(i)). On this occasion as well, the electric motor 4 is caused to generate power, and the CVT 6 is controlled to a low gear side to decrease engine output. Then, at a time point the carrier 24 and the ring gear 25 come to rotate at the same speed, the carrier clutch 51 is engaged, and the ring gear clutch 52 is disengaged (refer to Table 2(i)). As a result, as shown in FIG. 2(*i*), rotation of the input shaft 61 of the CVT 6 is transmitted to the rotor 41 of the electric motor 4 via the planetary gear mechanism 2 (i.e. the ring gear 25, planetary pinion 23, and carrier 24), so that running energy is quickly converted into power generating energy (energy which drives the electric motor 4 to generate power) to generate a greater regenerative braking force than braking force of engine brake. On this occasion, only the braking force generated by the motor 4 contributes to deceleration of the vehicle body, and the braking force generated by engine brake does not contribute to deceleration of the vehicle body.

Further, in the case where the vehicle is backed using an output from the engine 3, the carrier clutch 51 is engaged while the ring gear clutch 52 is unengaged, and further the unengaged ring gear brake 53 is brought into a friction engaged state (refer to Table 2(j)). If the ring gear brake 52 is friction-engaged, and the braking force of the ring gear brake 53 is controlled such that the planetary carrier 24 is rotated in the opposite direction, the vehicle running state is changed from a state indicated by a chain line in FIG. 2(*j*) to a state indicated by a solid line in FIG. 2(*j*), and the planetary carrier 24 is rotatively driven in the opposite direction by engine revolution to back the vehicle.

In the hybrid vehicle according to the first embodiment of the present invention constructed as above, when the vehicle is driven using only the engine 3 without using the motor 4 (refer to Table 2(d) and FIG. 2(*d*)), the rotor 41 of the motor 4 is stopped to prevent unnecessary motor rotation and suppress energy loss and motor heating. This inhibits affection of heat on parts around the motor 4.

Further, when the vehicle is running at an intermediate or high speed, the vehicle is driven using only the engine 3, and when the vehicle is running at a relatively low speed, the vehicle is driven using the motor 4, and hence the rotational speed of the motor 4 being operated can be easily reduced, and the voltage required for a battery for controlling the rotation of the motor 4 can be reduced. Therefore, the voltage of the battery for controlling the rotation of the motor 4 is allowed to be low, and hence battery costs and weight can be reduced, which leads to reduction in vehicle weight and costs. Therefore, the practical performance of the hybrid vehicle can be improved.

Figure 3:
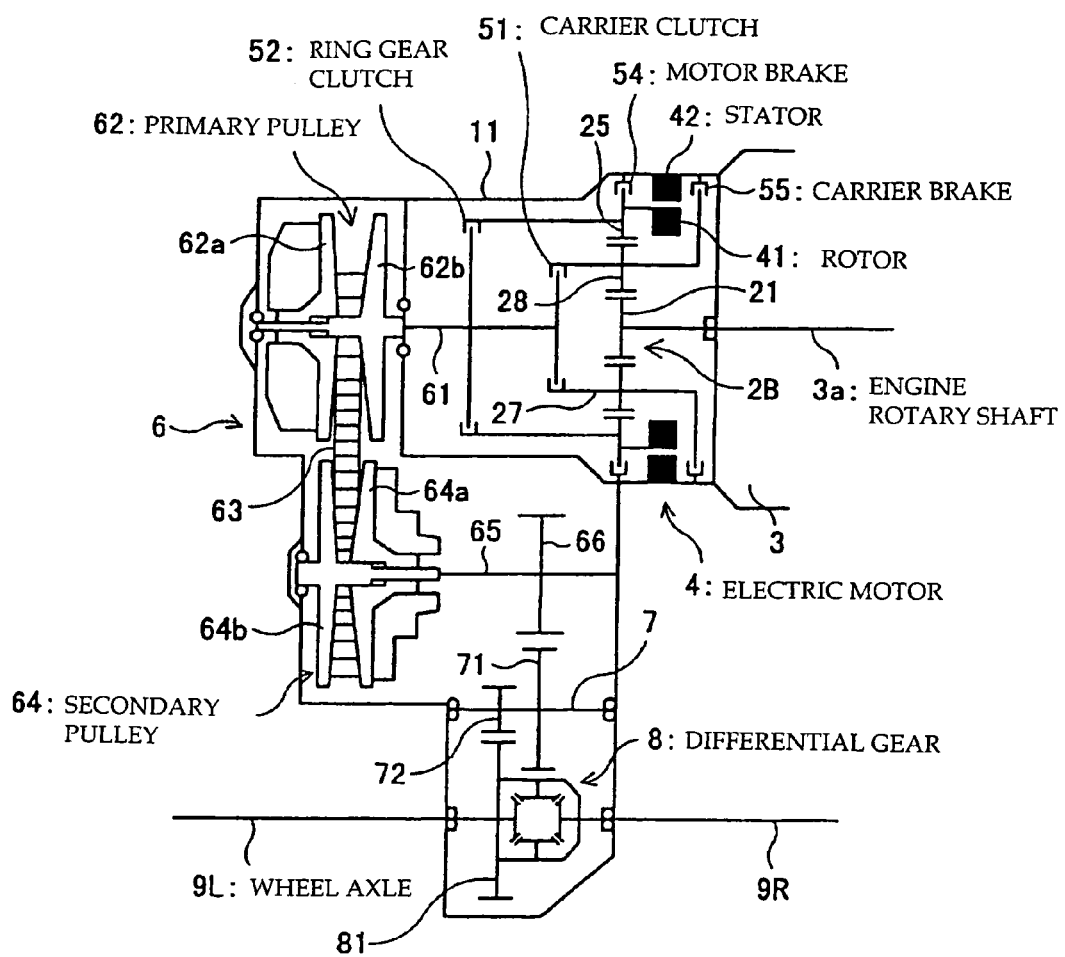
FIG. 3 is a view schematically showing a driving system (mainly a transmission) of a hybrid vehicle according to a second embodiment of the present invention.
Figure 4:
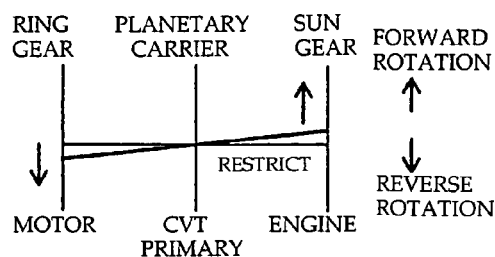
Figure 4:
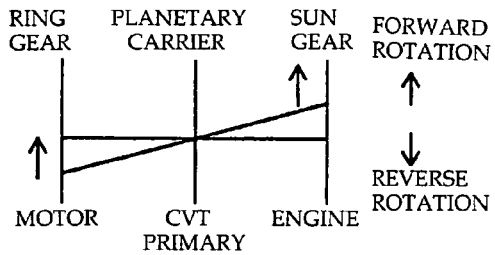
Figure 4:
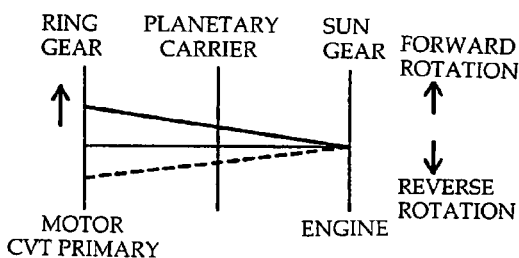
Figure 4:
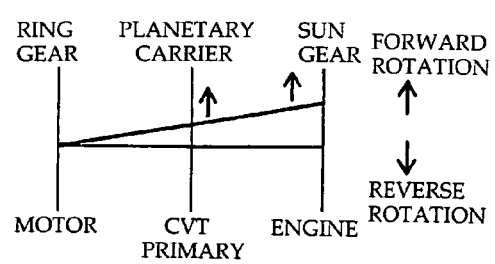
Figure 4:
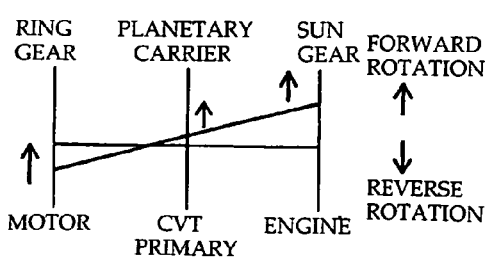
Figure 4:
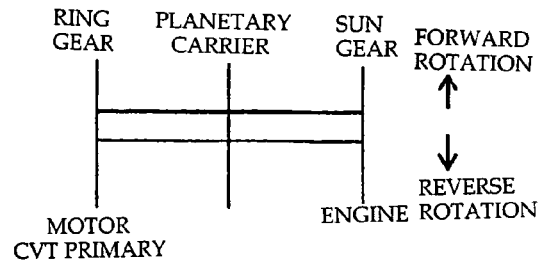
Figure 4:
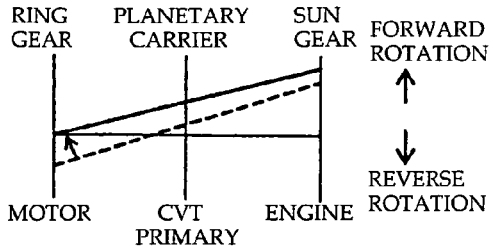
Figure 4:
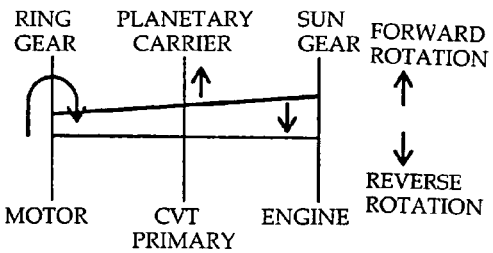
Figure 4:
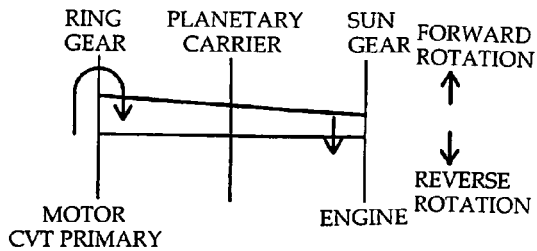
Figure 4:
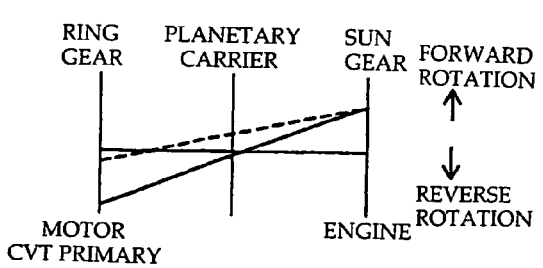

Next, a second embodiment of the present invention will be described. FIGS. 3 and 4 are views showing a hybrid vehicle according to the second embodiment, in which FIG. 3 is a driving system (mainly a transmission) of the hybrid vehicle, and FIG. 4 is a nomographic chart showing elements of a planetary gear mechanism in the driving system. It should be noted that in FIG. 3, the same reference numerals as in FIGS. 1 and 7 denote elements and parts similar to or corresponding to those illustrated in FIGS. 1 and 7.

Although the planetary gear mechanism 2A (refer to FIG. 1) according to the first embodiment is the double pinion type, a planetary gear mechanism 2B in the driving system of the hybrid vehicle according to the present embodiment is a single pinion type as shown in FIG. 3. The rotational relationship between a sun gear, a carrier, and a ring gear of the single pinion type is different from that of the double pinion type, and hence in the present embodiment, the electric motor 4 is attached to the ring gear.

Specifically, the planetary gear mechanism 2B of the single pinion type is provided at the inlet of a transmission 1. The planetary gear mechanism 2B is comprised of a sun gear 21, a pinion 28 which is engaged with the sun gear 21, a carrier 27 which supports the pinion 28, and a ring gear 25 which is engaged with the pinion 28.

The sun gear 21 is connected to a rotary shaft 3*a* of an engine (internal combustion engine) 3, and a rotor 41 of an electric motor (hereinafter referred to as "electric motor" or simply as "motor") 4 is connected to the ring gear 25. On the other hand, the carrier 27 can be connected to an input shaft 61 of a CVT 6 via a carrier clutch (a first engaging/disengaging device) 51, while the ring gear 25 can be connected to the input shaft 61 of the CVT 6 via a ring gear clutch (a second engaging/disengaging device) 52. A carrier brake (a first rotation restricting device) 55 is interposed between a transmission casing 11 and the carrier 27. Further, the transmission casing 11 is provided with a stator 42 of the electric motor 4 such that the stator 42 is opposed to the rotor 41.

A motor brake (a second rotation restricting device) 54 is interposed between the rotor 41 of the electric motor 4 and the transmission casing 11.

As is the case with the first embodiment, the CVT 6 includes the input shaft 61, a primary pulley 62, a belt 63, a secondary pulley 64, and an output shaft 65. The primary pulley 62 includes a movable sheave 62*a* and a fixed sheave 62*b*, and the secondary pulley 64 includes a movable sheave 64*a* and a fixed sheave 64*b*. Further, as is the case with the first embodiment, rotation of the output shaft 65 is transmitted to a differential gear 8 via a gear 66, counter gears 71 and 72, and a ring gear 81, so that left and right wheel axles (wheel driving shafts) 9L and 9R can be rotatively driven.

The carrier clutch 51, ring gear clutch 52, carrier brake 55, and motor brake 54 are hydraulic friction engaging devices of a wet multi-disc type which is friction-engaged by a hydraulic actuator, and is friction-engaged by hydraulic fluid supplied from a hydraulic control circuit, not shown. As shown in Table 3, the clutches 51 and 52 and the brakes 55 and 54 are engaged and disengaged properly to realize various power transmission states as shown in a nomographic chart of FIG. 4.

TABLE 3

| OPERATIVE MODE OF DRIVING SYSTEM | CARRIER CLUTCH | RING GEAR CLUTCH | CARRIER BRAKE | MOTOR BRAKE |
|---|---|---|---|---|
| (a) ENGINE IS STARTED BY ELECTRIC MOTOR | X | X | ◯ | X |
| (b) POWER GENERATING WHEN VEHICLE IS AT STANDSTILL (P RANGE) | X | X | ◯ | X |
| (c) DRIVE BY ELECTRIC MOTOR (FORWARD AT LOW SPEED, REARWARD) | X | ◯ | X | X |
| (d) DRIVE BY ENGINE (AT INTERMEDIATE OR HIGH SPEED) | ◯ | X | X | ◯ |
| (e) DRIVE BY ENGINE AND MOTOR | ◯ | X | X | X |
| (f) POWER GENERATING IN DRIVING | ◯ | ◯ | X | X |
| (g) ENGINE TORQUE INCREASE (IN STARTING, AND LOW SPEED→INTERMEDIATE OR HIGH SPEED | ◯ | X | X | X→◯ |
| (h) REGENERATIVE BRAKING (IN SLOW DECELERATION) | ◯ | X | X | X |
| (i) REGENERATIVE BRAKING (IN RAPID DECELERATION) | ◯→X | X→◯ | X | X |
| (j) DRIVE REARWARD BY ENGINE | X | ◯ | X→□ | X |

X: UNENGAGED,
◯: ENGAGED,
□: FRICTION - ENGAGED

In the present embodiment, the planetary gear mechanism 2B is the single pinion type in which the motor 4 is connected to the ring gear 25 and the carrier 27 is provided with the carrier brake 55, and hence the same power transmission states as in the first embodiment can be realized by providing control which is partially different from control provided in the first embodiment.

Specifically, in the case where the engine 3 is started by the electric motor 4, only the carrier brake 55 is engaged while the ring gear clutch 52 and the motor brake 54 are unengaged (refer to Table 3(a)). Then, as shown in FIG. 4(a), running the electric motor 4 at a sufficient speed enables the engine 3 to be started. On this occasion, the rotational direction of the motor 4 is opposite to that of the engine 3. Of course, since the carrier clutch 51 and the ring gear clutch 52 are unengaged on this occasion, power is not transmitted to driving wheels.

Also, in the case where the electric motor 4 is run as a power generator for the purpose of charging while the vehicle is at a standstill, only the carrier brake 53 is engaged while the carrier clutch 51 and the ring gear clutch 52 are unengaged (refer to Table 3(b)). Then, as shown in FIG. 4(b), if the engine 3 rotates the electric motor 4, the electric motor 4 functions as a power generator to generate power for charging. On this occasion, the rotational direction of the motor 4 is opposite to that of the engine 3 as above. Further, of course, since the ring gear clutch 52 is unengaged, power is not transmitted to driving wheels.

Further, in the case where the vehicle is driven by only the electric motor 4, only the carrier clutch 52 is engaged while the carrier clutch 51, carrier brake 55, and motor brake 54 are unengaged (refer to Table 3(c)). Then, assuming that there is no input from the engine 3 (i.e. the sun gear 21 is stopped), as indicated by a thick solid line in FIG. 4(c), if the electric motor 4 is rotated in the direction opposite to the rotational direction of the engine 3, forward driving torque is input to the CVT 6 to move the vehicle forward, and as indicated by a broken line in FIG. 4(c), if the electric motor 4 is rotated in the same direction as the rotational direction of the engine 3, rearward driving torque is input to the CVT 6 to back the vehicle. This mode in which the vehicle is driven using only the electric motor 4 is executed when the vehicle is started, backed, or running at a low speed.

On the other hand, in the case where the vehicle is driven using only the engine 3, the carrier clutch 52 and the motor brake 54 are engaged while the ring gear clutch 52 and the carrier brake 55 are unengaged (refer to Table 3(d)). Therefore, as shown in FIG. 4(d), the sun gear 21 is rotated with the revolution of the engine 3, and the planetary carrier 27 is rotated in response to the rotation of the sun gear 21 to rotatively drive the input shaft 61 of the CVT 6, and when only the engine 3 is operated, forward driving torque is input from the engine 3 to the CVT 6 to move the vehicle forward. On this occasion, the rotor 41 of the motor 4 is stopped by the motor brake 54.

On this occasion, the ratio of the rotational speed of the sun gear 21 and the ring gear 25 (i.e. the ratio of the rotational speed of the output shaft 3a of the engine 3 and the CVT input shaft 61) is 1: (smaller than 1) as shown in FIG. 4(d).

Further, the above described mode in which the vehicle is driven by only the electric motor 4 is executed when the vehicle is running at an intermediate or high speed or when the vehicle is running at a low speed in the case where the residual capacity of a battery, not shown, as a power supply for the electric motor 4 is equal to or smaller than a reference value.

Further, in the case where the vehicle is driven using both the engine 3 and the electric motor 4, the carrier clutch 51 is engaged while the ring gear clutch 52, carrier brake 55, and motor brake 54 are unengaged (refer to Table 3(e)). Then, the engine 3 is operated, and the motor 4 is driven in the direction opposite to the rotational direction of the engine 3 and at a relatively low speed as compared with the engine 3, so that as shown in FIG. 4(*e*), the planetary carrier 27 is rotatively driven forward, and torque of the engine 3 and the electric motor 4 is input as forward driving torque from the planetary carrier 27 to the CVT 6 to move the vehicle forward. This mode in which the vehicle is driven using both the engine 3 and the electric motor 4 is executed when the vehicle is started and when the vehicle is running at a low speed.

Further, in the case where power is generated using the electric motor 4 while the vehicle is running, the carrier clutch 51 and the ring gear clutch 52 are engaged while the ring gear brake 53 and the motor brake 54 are unengaged (refer to Table 3(f)). As a result, as shown in FIG. 4(*f*), the sun gear 21, the planetary carrier 27, the ring gear 25, and the input shaft 61 of the CVT 6 are directly connected to each other, i.e. rotated integrally with each other, and when the electric motor 4 is run as a power generator while the engine 3 is run, part of driving force of the engine 3 rotatively drives the electric motor 4 as the power generator, and the rest of the driving force of the engine 3 is input as forward driving torque to the CVT 6 to move the vehicle forward.

Further, in the case where starting using the electric motor 4 is desired to be avoided due to a low battery capacity, and in the case where torque from the engine 3 is desired to be increased e.g. in extremely low vehicle speed/high load starting (rapid climbing road starting), the carrier brake 55 is disengaged, the carrier clutch 51 is engaged, and the ring gear clutch 52 and the motor brake 54 are kept unengaged (refer to Table 3(g) after the engine 3 is started (only the carrier brake 55 is engaged while the carrier clutch 51, ring gear clutch 52, and the motor brake 54 are unengaged; refer to Table 3(a) and FIG. 4(*a*)). As indicated by a broken line in FIG. 4(*g*), if power is generated using the electric motor 4 after the engine speed is increased to such a speed as to enable output of a great engine torque, the vehicle can be started with a greater engine torque than normal.

Then, if the motor brake 54 is gradually engaged at a time point the rotational speed of the rotor 41 of the electric motor 4 becomes approximately 0, the vehicle can be brought into a normal running state, i.e. a running state in which the vehicle is driven using the engine 3 (refer to FIG. 4(*d*)) as indicated by a solid line in FIG. 4(*g*).

Further, if slow deceleration regenerative braking conditions (for example, an accelerator is off) when the vehicle is driven using only the engine 3 with the carrier clutch 51 and the motor brake 54 being engaged and the ring gear clutch 52 and the carrier brake 55 being unengaged, the motor brake 54 is disengaged, the carrier clutch 51 is kept engaged, and the ring gear clutch 52 and the carrier brake 55 are kept unengaged (refer to Table 3(h)). Then, the electric motor 4 is caused to generate power, and the CVT 6 is controlled to a low gear side to decrease engine output. As a result, as shown in FIG. 4(*h*), rotation of the input shaft 61 of the CVT 6 is transmitted to the rotor 41 of the electric motor 4 via the planetary gear mechanism 2 (i.e. the ring gear 25, planetary pinion 23, and carrier 24), and slow regenerative braking corresponding to engine brake is carried out such that driving energy is converted into power generating energy (energy which drives the electric motor 4 to generate power).

Further, if rapid deceleration regenerative braking conditions (for example, a brake is on) when the vehicle is run using only the engine 3 (with the carrier clutch 51 and the motor brake 54 being engaged and the ring gear clutch 52 and the carrier brake 55 being unengaged), the motor brake 54 is disengaged, the ring gear clutch 52 is kept engaged, and the carrier clutch 51 and the ring gear brake 53 are kept unengaged (refer to Table 3(i)). On this occasion as well, the electric motor 4 is caused to generate power, and the CVT 6 is controlled to a low gear side to decrease engine output. Then, at a time point the carrier 24 and the ring gear 25 come to rotate at the same speed, the ring gear clutch 52 is engaged, and the carrier clutch 51 is disengaged (refer to Table 3(i)). As a result, as shown in FIG. 4(*i*), rotation of the input shaft 61 of the CVT 6 is transmitted to the rotor 41 of the electric motor 4 via the planetary gear mechanism 2 (i.e. the ring gear 25, planetary pinion 23, and carrier 24), so that running energy is quickly converted into power generating energy (energy which drives the electric motor 4 to generate power) to generate a greater regenerative braking force than the braking force of engine brake. On this occasion, only the braking force generated by the motor 4 contributes to deceleration of the vehicle body, and the braking force generated by engine brake does not contribute to deceleration of the vehicle body.

Further, in the case where the vehicle is backed using an output from the engine 3, the ring gear clutch 52 is engaged, the carrier clutch 51 is disengaged, and the carrier brake 55 is brought into a friction engaged state (refer to Table 3(j)). If the ring gear brake 53 is friction-engaged, and the CVT 6 is controlled such that the planetary carrier 24 is rotated in the opposite direction, the vehicle running state is changed from a state indicated by a chain line in FIG. 4(*j*) to a state indicated by a solid line in FIG. 4(*j*), and the planetary carrier 24 is rotatively driven in the opposite direction by engine revolution to back the vehicle.

In the hybrid vehicle according to the second embodiment of the present invention constructed as above, when the vehicle is driven using only the engine 3 without using the motor 4 (refer to Table 3(d) and FIG. 4(*d*)), the rotor 41 of the motor 4 is stopped to prevent unnecessary motor rotation and suppress energy loss and motor heating. This inhibits affection of heat on parts around the motor 4.

Further, when the vehicle is running at an intermediate or high speed, the vehicle is driven using only the engine 3, and when the vehicle is running at a relatively low speed, the vehicle is driven using the motor 4, and hence the rotational speed of the motor 4 being operated can be easily suppressed, and the voltage required for a battery for controlling the rotation of the motor 4 can be suppressed. Therefore, the voltage of the battery for controlling the rotation of the motor 4 is allowed to be low, and hence battery costs and weight can be reduced, which leads to reduction in vehicle weight and costs. Therefore, the practical performance of the hybrid vehicle can be improved.

Figure 5:
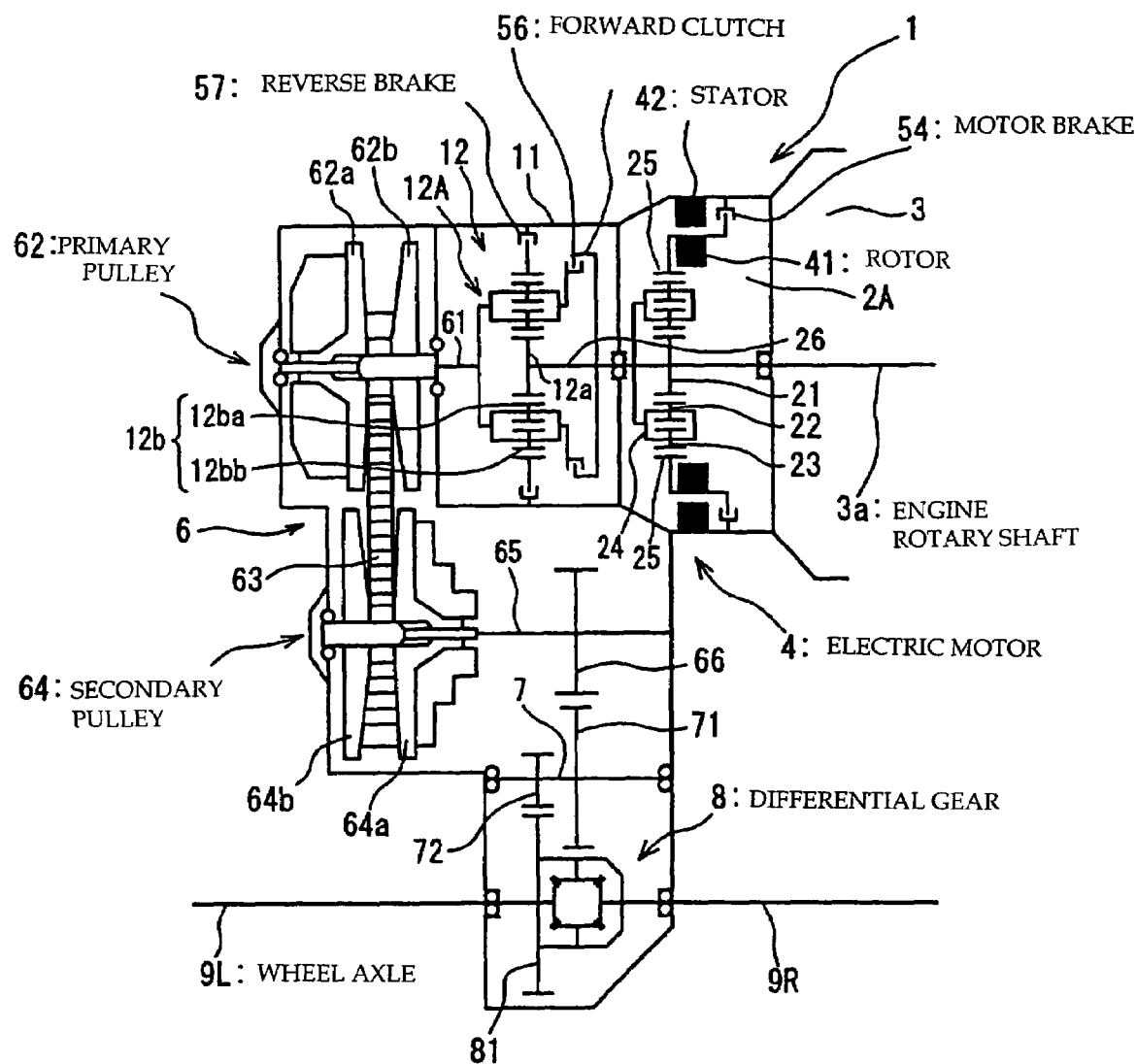
FIG. 5 is a view schematically showing a driving system (mainly a transmission) of a hybrid vehicle according to a third embodiment of the present invention.
Figure 6:
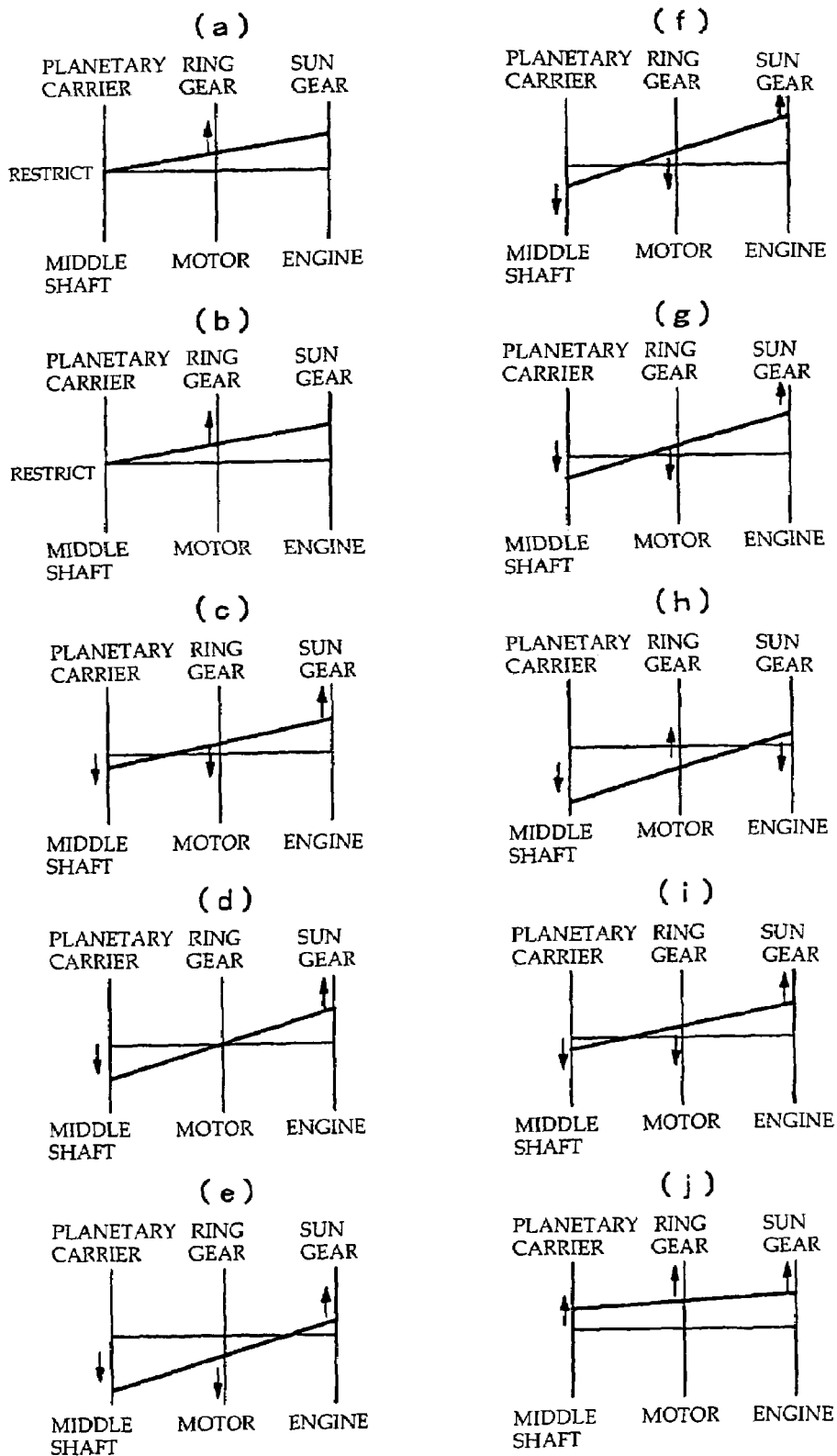

Next, a third embodiment of the present invention will be described. FIGS. 5 and 6 are views showing a hybrid vehicle according to the third embodiment, in which FIG. 5 is a driving system (mainly a transmission) of the hybrid vehicle, and FIG. 6 is a nomographic chart showing elements of a planetary gear mechanism in the driving system. It should be noted that in FIG. 5, the same reference numerals as in FIGS. 1, 3, and 7 denote elements and parts similar to or corresponding to those illustrated in FIGS. 1, 3, and 7.

As shown in FIG. 5, the driving system of the hybrid vehicle according to the present embodiment is comprised of an engine (internal combustion engine) 3, an electric motor (hereinafter referred to as "electric motor" or simply as "motor") 4, and a power transmission mechanism 1 including a transmission 6. A casing 11 for the power transmission mechanism 1 is integrally fixed to a cylinder block of the engine 3.

A planetary gear mechanism 2A is provided at the inlet of the power mechanism 1. A continuously variable transmission (CVT) 6 is provided in the middle of the power transmission mechanism 1. A rotational direction switching mechanism 12 is disposed between the engine 3 and the motor 4 and the CVT 6 of the power transmission mechanism 1. Therefore, rotations input from the engine 3 and the motor 4 are input to the CVT 6 via the rotational direction switching mechanism 12.

The planetary gear mechanism 2A provided at the entrance of the power transmission mechanism 1 is a double pinion type, which is comprised of a sun gear 21, an inner pinion 22 which is engaged with the sun gear 21, an outer pinion 23 which is engaged with the inner pinion 22, a planetary carrier (also simply referred to as "carrier") 24 which supports the pinions 22 and 23, and a ring gear 25 which is engaged with the outer pinion 23.

The sun gear 21 is a rotation element (a first input rotation element) connected to a rotary shaft 3a of the engine 3, the ring gear 25 is a rotation element (a second input rotation element) to which a rotor 41 of the electric motor 4 is connected, and the carrier 24 is a rotation element (an output rotation element) which can be connected to an input shaft 61 of the CVT 6 via a middle shaft (an output shaft of the planetary gear mechanism 2A) 26 and the rotational direction switching mechanism 12.

A motor brake (a rotation restricting device) 54 is interposed between the rotor 41 of the electric motor 4 and the transmission casing 11.

As is the case with the prior art (FIG. 7), a planetary gear mechanism 12A which is comprised of a sun gear 12a, planetary pinions 12ba and 12bb, a carrier 12c, and a ring gear 12d is used as the rotational direction switching mechanism 12. Specifically, the middle shaft 26 integrated with the carrier 24 of the planetary gear mechanism 2A is directly connected to the sun gear 12a of the planetary gear mechanism 12A. Further, the carrier 12c which supports the pinion gears 12ba and 12bb is connected to the middle shaft 26 on the planetary gear mechanism 2A side via a forward clutch 56. Further, the carrier 12c of the rotational direction switching mechanism 12 is connected on one side thereof (on the CVT 6 side) to an input shaft 61 coaxially integrated with a primary pulley 62 of the CVT 6. Further, a reverse brake 57 is interposed between the ring gear 12d and the casing 11.

Therefore, rotation of the engine 3 and rotation of the motor 4 are transmitted from the carrier 24 of the planetary gear mechanism 2A to the sun gear 12a of the rotational direction switching mechanism 12 via the middle shaft 26. If the forward clutch 56 is engaged and the reverse brake 57 is unengaged, the sun gear 12a and the carrier 12c of the rotational direction switching mechanism 12 are directly connected to each other, so that the input shaft 61 is integrally rotated with the middle shaft 26.

On the other hand, if the forward clutch 56 is unengaged and the reverse brake 57 is engaged, the carrier 12c and the sun gear 12a are rotated in opposite directions since the rotational direction switching mechanism 12 is implemented by the planetary gear mechanism of the double pinion type, the sun gear 12a and the carrier 12c can be rotated relatively to each other, and the ring gear 12d is locked to be inhibited from rotating.

Further, if both the forward clutch 56 and the reverse brake 57 are engaged, the input shaft 61 and the middle shaft 26 are locked, and the carrier 24 of the planetary gear mechanism 2A and the primary pulley 62 connected to the input shaft 61 of the CVT 6 are locked to be inhibited from rotating. Therefore, on this occasion, the sun gear 21 and the ring gear 25 of the planetary gear mechanism 2A are moved in response to the movement of each other. Namely, the engine 3 connected to the sun gear 21 and the motor 4 connected to the ring gear 25 are moved in response to the movement of each other.

On this occasion, the ratio of the rotational speed $\omega S$ of the sun gear 21 to the rotational speed $\omega R$ of the ring gear 25 ($\omega S:\omega R$) is $(1/ZS):(1/ZR)$ where the number of teeth of the sun gear 21 is represented by ZS and the number of teeth of the ring gear 25 is represented by ZR, and since the number of teeth ZS is smaller than the number of teeth ZR, the rotational speed $\omega R$ of the ring gear 25 is lower than the rotational speed $\omega S$ of the sun gear 21. Namely, the motor 4 connected to the ring gear 4 is run at a lower speed than the engine 3 connected to the sun gear 21.

The CVT 6 includes the primary pulley 62 connected to the input shaft 61 and a secondary pulley 64 connected to the primary pulley 62 via a belt 63. An output shaft 65 of the CVT 6 is connected to the secondary pulley 64. It should be noted that the primary pulley 62 includes a movable sheave 62a and a fixed sheave 62b, and the secondary pulley 64 includes a movable sheave 64a and a fixed sheave 64b.

Further, rotation of the output shaft 65 is transmitted to a differential gear 8 via a gear 66 fixedly installed on the output shaft 65, a counter gear 71 fixedly installed on a counter shaft 7, a counter gear 72, and a ring gear 81, so that left and right wheel axles (wheel driving shafts) 9L and 9R can be rotatively driven via the differential gear 8.

It should be noted that due to the presence of the counter shaft 7 between the CVT 6 and the wheel axles (wheel driving shafts) 9L and 9R, the wheel axles (wheel driving shafts) 9L and 9R are rotated in the same direction as the rotational direction of the primary pulley 62, belt 63, and secondary pulley 64.

The forward clutch 56, reverse brake 57, and motor brake 54 are hydraulic friction engaging devices of a wet multi-disc type which is friction-engaged by a hydraulic actuator, and is friction-engaged by hydraulic fluid supplied from a hydraulic control circuit, not shown. As shown in Table 4, the clutch 56 and the brakes 57 and 54 are engaged and disengaged properly to realize various power transmission states as shown in a nomographic chart of FIG. 6.

TABLE 4

| | OPERATIVE MODE OF DRIVING SYSTEM | REVERSE BRAKE | FORWARD CLUTCH | MOTOR BRAKE |
|---|---|---|---|---|
| (a) | ENGINE IS STARTED BY ELECTRIC MOTOR | ○ | ○ | x |
| (b) | POWER GENERATING WHEN VEHICLE IS AT STANDSTILL (P RANGE) | ○ | ○ | x |
| (c) | START FORWARD, DRIVE AT LOW SPEED | ○ | x | x |
| (d) | DRIVE BY ENGINE | ○ | x | ○ |
| (e) | DRIVE BY ENGINE AND MOTOR | ○ | x | x |
| (f) | POWER GENERATING IN DRIVING | ○ | x | x |
| (g) | ENGINE TORQUE INCREASE | ○ | x | x |
| (h) | REGENERATIVE BRAKING | ○ | x | x |

TABLE 4-continued

| OPERATIVE MODE OF DRIVING SYSTEM | REVERSE BRAKE | FORWARD CLUTCH | MOTOR BRAKE |
|---|---|---|---|
| (i) DRIVE REARWARD BY ENGINE | x | ○ | x |
| (j) DRIVE REARWARD BY ENGINE AND MOTOR | ○ | x | x | x: UNENGAGED, ○: ENGAGED

Specifically, in the case where the engine 3 is started by the electric motor 4, the forward clutch 56 and the reverse brake 57 are engaged while the motor brake 54 is unengaged (refer to Table 4(a)). As a result, even when the motor 4 and the engine 3 are rotated, the engine 3 connected to the sun gear 21 and the motor 4 connected to the ring gear 25 are moved in response to the movement of each other while rotations of the motor 4 and the engine 3 are not transmitted to the input shaft 61 of the CVT 6. Then, as shown in FIG. 6(a), rotating the motor 4 enables the engine 3 to be started.

It should be noted that the motor 4 is rotated in the same direction as the rotational direction of the engine 3, and the engine 3 is rotated at a speed which is obtained by multiplying the rotational speed of the motor 4 by ZR/ZS (ZR/ZS>1 because ZS<ZR).

Also, in the case where the electric motor 4 is run as a power generator for the purpose of charging while the vehicle is at a standstill, the forward clutch 56 and the reverse brake 57 are engaged while the motor brake 54 is unengaged (refer to Table 4(b)). As a result, the engine 3 connected to the sun gear 21 and the motor 4 connected to the ring gear 25 are moved in response to the movement of each other while rotations of the motor 4 and the engine 3 are not transmitted to the input shaft 61 of the CVT 6. Then, as shown in FIG. 6, if the engine 3 rotates the motor 4, the motor 4 functions as a power generator to generate power for charging. On this occasion as well, the motor 4 is rotated in the same direction as the rotational direction of the engine 3.

In the case where the vehicle is started to move forward, or is driven at a low speed, the reverse brake 57 is engaged while the forward clutch 56 and the motor brake 54 are unengaged (refer to Table 4(c)). Then, as shown in FIG. 6(c), the engine 3 is rotated, and the motor 4 is brought into a loaded state (power generating state). As a result, the carrier 24 is rotated in the direction opposite to the rotational direction of the sun gear 21, and rotation of the carrier 24 is transmitted to the sun gear 12a of the rotational direction switching mechanism 12. Since the forward clutch 56 is unengaged and the reverse brake 57 is engaged, rotation of the sun gear 12a causes the carrier 12c to be rotated in the direction opposite to the sun gear 12a (i.e. in the same direction as the rotational direction of the engine 3). The rotation of the carrier 12c rotatively drives the input shaft 61 of the CVT 6 in the same direction as the rotational direction of the engine 3, and hence forward driving torque is input from the engine 3 and the motor (in the power generating state) 4 to the CVT 6, so that the vehicle is started to move forward. This state is maintained when the vehicle is driven at a low speed, and as the vehicle speed increases, the rotational speed (in the power generating state) 4 is decreased.

Further, in the case where the vehicle is driven using only the engine 3, the reverse brake 57 is engaged while the forward clutch 56 is disengaged, and at a time point the speed of the motor 4 which is generating power is lowered to approximately 0, the motor brake 54 is engaged (refer to Table 4(d)). As a result, as shown in FIG. 6(d), the ring gear 25 is locked to be inhibited from rotating, and when the sun gear 21 is rotated with the rotation of the engine 3, the carrier 24 is rotated in the direction opposite to the rotational direction of the sun gear 21 in response to the rotation of the sun gear 21, so that the rotation of the carrier 24 is transmitted to the sun gear 21a of the rotational direction switching mechanism 12 via the middle shaft 26. Since the forward clutch 56 is unengaged and the reverse brake 57 is engaged, the sun gear 12a and the carrier 12c can rotate relatively to each other, and the ring gear 12d is locked to be inhibited from rotating, and hence when the sun gear 12a is rotated, the carrier 12c is rotated in the direction opposite to the rotational direction of the sun gear 12a (i.e. in the same direction as the rotational direction of the engine 3). The rotation of the carrier 12c rotatively drives the input shaft 61 of the CVT 6 in the same direction as the rotational direction of the engine 3, and hence forward driving torque is input from the engine 3 to the CVT 6, so that the vehicle is moved forward. On this occasion, the rotor 41 of the motor 4 is stopped by the motor brake 54.

Further, in the case where the vehicle is driven using both the engine 3 and the motor 4, the reverse brake 57 is engaged while the forward clutch 56 and the motor brake 54 are unengaged (refer to Table 4(e)). Then, as shown in FIG. 6(e), the engine 3 is rotated, and the motor 4 is rotated in the direction opposite to the rotational direction of the engine 3. As a result, the ring gear 25 is rotated in the direction opposite to the rotational direction of the sun gear 21, and the carrier 24 is rotated at a speed which is higher than in the case where the ring gear 25 is fixed (i.e. the vehicle is driven using only the engine 3; refer to FIG. 6(d)) due to the rotation of the motor 4. The rotation of the carrier 24 is transmitted to the sun gear 21a of the rotational direction switching mechanism 12 via the middle shaft 26. As in the case where the vehicle is driven using only the engine 3, the forward clutch 56 is unengaged and the reverse brake 57 is engaged, and hence the carrier 12c is rotated in the direction opposite to the rotational direction of the sun gear 12a (i.e. in the same direction as the rotational direction of the engine 3) in response to the rotation of the sun gear 12a. The rotation of the carrier 12c rotatively drives the input shaft 61 of the CVT 6 in the same direction as the rotational direction of the engine 3, and hence forward driving torque is input from the engine 3 and the motor 4 to the CVT 6, so that the vehicle is moved forward.

Further, in the case where power is generated using the motor 4 while the vehicle is running, the motor brake 54 is disengaged in the state in which the vehicle is driven using only the engine 3, i.e. the state in which the reverse brake 57 and the motor brake 54 are engaged and the forward clutch 56 is unengaged (refer to Table 4(f)). Then, the motor 4 is caused to function as a power generator to increase engine output. As a result, as shown in FIG. 6(f), an output from the engine 3 is distributed to the carrier 24 side and the ring gear 25 side. The engine output distributed to the carrier 24 is transmitted from the middle shaft 26 to the rotational direction switching mechanism 12, and is input to the input shaft 61 of the CVT 6 after the rotational direction is switched to the same direction as the rotational direction of the engine 3. The engine output distributed to the ring gear 25 side rotatively drives the rotor 41 integrated with the ring gear 25, so that power is generated by the motor 4.

Further, in the case where engine torque is desired to be increased in the state in which the vehicle is driven using only the engine 3, the motor brake 54 is disengaged in the state in which the reverse brake 57 and the motor brake 54 are engaged and the forward clutch 56 is unengaged (refer to Table 4(g)). Then, the motor 4 is caused to function as a power generator to increase engine output. As a result, as shown in FIG. 6(*g*), a power generating load (the ring gear side 25) is added to a vehicle driving load (the carrier 24 side) of the engine 3, so that torque output from the engine 3 can be quickly increased.

If regenerative braking conditions (for example, an accelerator is off) are satisfied when the vehicle is driven using both the engine 3 and the motor 4, i.e. in the state in which the reverse brake 57 is engaged and the forward clutch 56 and the motor brake 54 are unengaged (refer to Table 4(e)), the motor 4 which has functioned as an electric motor is caused to function as a power generator, and the CVT 6 is controlled to a low gear side to decrease engine output while the reverse brake 57 is kept engaged and the forward clutch 56 and the motor brake 54 are kept unengaged (refer to Table 4(h)). As a result, as shown in FIG. 6(*h*), rotation of the input shaft 61 of the CVT 6 is transmitted to the carrier 24 via the rotational direction switching mechanism 12 and the middle shaft 26, and the sun gear 21 on the engine 3 side is inhibited from rotating, so that the rotor 41 of the motor 4 connected to the ring gear 25 is rotatively driven. In this way, regenerative braking corresponding to engine brake is carried out such that driving energy is converted into power generating energy (energy which drives the electric motor 4 to generate power).

Further, in the case where the vehicle is backed using an output from the engine 3, the forward clutch 56 is engaged while the reverse brake 57 and the motor brake 54 are unengaged (refer to Table 4(i)). Then, as shown in FIG. 6(*i*), the engine 3 is rotated, and the motor 4 is brought into a loaded state (power generating state). As a result, the carrier 24 is rotated in the direction opposite to the rotational direction of the sun gear 21, and the rotation of the carrier 24 is transmitted to the sun gear 121a of the rotational direction switching mechanism 12 via the middle shaft 26. Since the forward clutch 56 is unengaged and the reverse brake 57 is engaged, the sun gear 12a and the carrier 12c are integrally rotated in the same direction (i.e. in the same direction as the rotational direction of the engine 3). The rotation of the carrier 12c rotatively drives the input shaft 61 of the CVT 6 in the direction opposite to the rotational direction of the engine 3, and hence rearward driving torque is input from the engine 3 and the motor (in the power generating state) 4 to the CVT 6, so that the vehicle is backed.

Further, in the case where the vehicle is backed using an output from the engine 3 and an output from the motor 4, the reverse brake 57 is engaged while the forward clutch 56 and the motor brake 54 are unengaged (refer to Table 4(j)). Then, as shown in FIG. 6(*j*), the engine 3 is rotated, and the motor 4 is rotated in the same direction as the rotational direction of the engine 3. As a result, the carrier 24 is rotated in the same direction as the rotational direction of the sun gear 21 rotated integrally with the engine 3 and the rotational direction of the ring gear 25 rotated integrally with the motor 4, and the rotation of the carrier 24 is transmitted to the sun gear 12a of the rotational direction switching mechanism 12 via the middle shaft 26. Since the forward clutch 56 is unengaged and the reverse brake 57 is engaged, the sun gear 12a and the carrier 12c are integrally rotated in opposite directions (i.e. in the direction opposite to the rotational direction of the engine 3). The rotation of the carrier 12c rotatively drives the input shaft 61 of the CVT 6 in the direction opposite to the rotational direction of the engine 3, and hence rearward driving torque is input from the engine 3 and the motor (in the power generating state) 4 to the CVT 6, so that the vehicle is backed.

In the hybrid vehicle according to the third embodiment of the present invention constructed as above, when the vehicle is driven using only the engine 3 without using the motor 4 (refer to Table 4(d) and FIG. 6(*d*)), the rotor 41 of the motor 4 is stopped to prevent unnecessary motor rotation and suppress energy loss and motor heating. This inhibits affection of heat on parts around the motor 4.

Further, the ratio of the rotational speed Nm of the motor 4 to the rotational speed Ne of the engine 3 is equal to the ratio of the inverse numbers of the number of teeth of the ring gear 25 and the sun gear 21 of the planetary gear mechanism 2A as follows:

$$Nm:Ne=(1/ZS):(1/ZR)=ZS:ZR$$

Since the number of teeth ZS is smaller than the number of teeth ZR, the rotational speed Nm of the motor 4 is lower than the rotational speed Ne of the engine 3. Thus, when the motor 4 is run, the rotational speed Nm of the motor 4 can be suppressed.

As a result, the voltage required for a battery for controlling the rotation of the motor 4 can be reduced. Therefore, the voltage of the battery for controlling the rotation of the motor 4 is allowed to be low, and hence battery costs and weight can be reduced, which leads to reduction in vehicle weight and costs. Therefore, the practical performance of the hybrid vehicle can be improved.

In particular, since the planetary gear mechanism 12A is used as the rotational direction switching mechanism 12, the rotational directions can be changed independently of the planetary gear mechanism (planetary gear type power transmission mechanism) 2A, so that the rotational speed Nm of the motor 4 can easily be controlled to a lower speed.

Further, since the CVT is used as a transmission, the engine and the motor can be efficiently operated to improve both the fuel economy and the driving performance.

It should be understood that the present invention is not limited to the embodiments described above, but various variations of the above described embodiments may be possible without departing from the spirits of the present invention.

Specifically, the construction of the hybrid vehicle according to the present invention which is provided with the electric motor and the engine used for driving the vehicle, and outputs power from the engine or the electric motor to driving wheels via the planetary gear mechanism should not be limited to the above described embodiments insofar as the hybrid vehicle includes the rotation restricting device which properly restricts rotation of the rotor of the electric motor.

For example, in addition to a belt type continuously variable transmission, either a toroidal type continuously variable transmission or a non-continuous transmission may be used as a transmission.

Further, which element of a planetary gear mechanism an input side element (such as an engine rotary shaft or an electric motor) is to be connected to, and which element of the planetary gear mechanism is to be connected to a transmission may be determined according to the construction of a power transmission system extending to driving wheels.

The invention claimed is:

1. A hybrid vehicle, comprising:
   an engine rotary shaft adapted to be connected to an internal combustion engine;

an electric motor disposed coaxially with said engine rotary shaft;

a first planetary gear mechanism disposed coaxially with the engine rotary shaft and a rotary shaft of said electric motor, said first planetary gear mechanism including a sun gear, a ring gear, planetary pinions, and a carrier supporting said planetary pinions;

a transmission including an input shaft to which power is transmitted from said internal combustion engine and said electric motor via said first planetary gear mechanism and an output shaft connected to driving wheels; and a rotation restricting device, provided between the engine and the electric motor, that selectively restricts rotation of a rotor of said electric motor.

2. A hybrid vehicle according to claim 1, wherein said transmission includes a continuously variable transmission.

3. A hybrid vehicle, comprising:

an engine rotary shaft adapted to be connected to an internal combustion engine;

an electric motor disposed coaxially with said engine rotary shaft;

a planetary gear mechanism including a sun gear, at least one planetary pinion, a ring gear, and a carrier rotatably supporting said planetary pinion, the engine rotary shaft being connected to said sun gear, and a rotor of said electric motor being connected to said carrier;

a transmission including an input shaft to which power is transmitted from said internal combustion engine and said electric motor via said planetary gear mechanism and an output shaft connected to driving wheels;

a first engaging and disengaging device that enables and disables transmission of power between said carrier and an input shaft of said transmission;

a second engaging and disengaging device that enables and disables transmission of power between said ring gear and the input shaft of said transmission;

a first rotation restricting device that selectively restricts rotation of said ring gear; and a second rotation restricting device, provided between the engine and the electric motor, that selectively restricts rotation of said rotor.

4. A hybrid vehicle according to claim 3, wherein said planetary gear mechanism is a double pinion type includes an inner pinion engaged with said sun gear and an outer pinion engaged with said ring gear as said planetary pinions, and the rotor of said electric motor is connected to said carrier, and said first rotation restricting device properly restricts rotation of said ring gear.

5. A hybrid vehicle according to claim 3, wherein said transmission includes a continuously variable transmission.

6. A hybrid vehicle according to claim 3, comprising:

a control device that controls states of said first and second engaging and disengaging devices and said first and second rotation restricting devices; and wherein said control device controls said second rotation restricting device to stop the rotor of said electric motor when the driving wheels are driven using only an output from said internal combustion engine.

7. A hybrid vehicle according to claim 6, wherein the driving wheels are driven using only an output from said internal combustion engine when the vehicle is running at an intermediate or high speed.

8. A hybrid vehicle according to claim 6, wherein said control device controls said second rotation restricting device such that restrictions imposed on rotation of the rotor of said electric motor are eliminated so as to operate said electric motor as a power generator when regenerative braking conditions are satisfied while the driving wheels are driven using only an output from said internal combustion engine.

9. A hybrid vehicle according to claim 1, further comprising:

a second planetary gear mechanism disposed between said first planetary gear mechanism for selectively converting a rotating direction of the input shaft of the transmission.

* * * * *